US00RE38559E1

(19) United States
(12) Reissued Patent
Caspi et al.

(10) Patent Number: US RE38,559 E
(45) Date of Reissued Patent: Jul. 27, 2004

(54) AUTOMATIC VISUAL INSPECTION SYSTEM

(76) Inventors: Amiram Caspi, 75 Hadar Street, 38900 Caesarea (IL); Zeev Smilansky, 41 Meishar, Kfar Meishar (IL); Zvi Lapidot, 16 Hanassi Harishon Street, 76302 Rehovot (IL)

( * ) Notice: This patent is subject to a terminal disclaimer.

(21) Appl. No.: 09/607,343

(22) Filed: Jun. 30, 2000

Related U.S. Patent Documents

Reissue of:
(64) Patent No.: 5,774,573
Issued: Jun. 30, 1998
Appl. No.: 08/405,938
Filed: Mar. 17, 1995

U.S. Applications:
(63) Continuation-in-part of application No. 07/061,344, filed on May 17, 1993, now Pat. No. 5,774,572, which is a continuation of application No. 07/961,070, filed on Oct. 14, 1992, now abandoned, which is a continuation of application No. 07/804,511, filed on Dec. 10, 1991, now abandoned, which is a continuation of application No. 06/684,583, filed on Dec. 20, 1984, now abandoned.

(51) Int. Cl.[7] ..... G06K 9/00
(52) U.S. Cl. ..... 382/141
(58) Field of Search ..... 382/141, 144, 382/145, 146, 147, 148, 149, 150, 151, 199, 276, 278, 298, 254, 237; 364/724.12, 728.05, 728.03; 358/137, 140

(56) References Cited

U.S. PATENT DOCUMENTS 4,041,286 A 8/1977 Sanford ..... 235/151.3
4,048,485 A * 9/1977 Nussbaumer ..... 364/728.01

(List continued on next page.)

FOREIGN PATENT DOCUMENTS

EP 0 594 146 A2 4/1994 ..... G01R/31/308
WO WO 00/11454 3/2000 ..... G01N/21/88
WO WO 00 19372 4/2000 ..... G06T/5/30

OTHER PUBLICATIONS

U.S. Reissue patent application Ser. No. 09/607,318, filed Jun. 30, 2000, Inventors: Amiram Caspi and Zvi Lapidot; and first and second preliminary amendments.

(List continued on next page.)

*Primary Examiner*—Jose L. Couso

(57) ABSTRACT

A binary map of an object having edges is produced by first producing a digital grey scale image of the object with a given resolution, and processing the grey scale image to produce a binary map of the object at a resolution greater than said given resolution. Processing of the grey scale image includes the step of converting the 2-dimensional digital grey scale image with a filter function related to the second derivative of a Gaussian function forming a 2-dimensional convolved image having signed values. The location of an edge in the object is achieved by finding zero crossings between adjacent oppositely signed values. Preferably, the zero crossings are achieved by an interpolation process that produces a binary bit map of the object at a resolution greater than the resolution of the grey scale image. The nature of the Gaussian function whose second derivative is used in the convolution with the grey scale image, namely its standard deviation, is empirically selected in accordance with system noise and the pattern of the traces on the printed circuit board such that the resulting bit map conforms as closely as desired to the lines on the printed circuit board.

The convolution can be performed with a difference-of-two Gaussians, one positive and one negative. It may be achieved by carrying out a one-dimensional convolution of successive lines of the grey scale image to form a one-dimensional convolved image, and then carrying out an orthogonal one-dimensional convolution of successive lines of the one-dimensional convolved image to form a two-dimensional convolved image. Each one-dimensional convolved image may be formed by multiple convolutions with a boxcar function.

37 Claims, 17 Drawing Sheets

U.S. PATENT DOCUMENTS

| | | | | | |
|---|---|---|---|---|---|
| 4,097,847 | A | | 6/1978 | Forsen et al. | 340/146.3 AE |
| 4,115,803 | A | | 9/1978 | Morton | 358/107 |
| 4,183,013 | A | | 1/1980 | Agrawala et al. | 340/146.3 AC |
| 4,259,661 | A | * | 3/1981 | Todd | 382/205 |
| 4,303,947 | A | * | 12/1981 | Stoffel | 382/300 |
| 4,330,833 | A | * | 5/1982 | Pratt et al. | 382/265 |
| 4,399,554 | A | | 8/1983 | Perkins, III et al. | 382/8 |
| 4,424,530 | A | | 1/1984 | Taylor | 358/96 |
| 4,442,542 | A | * | 4/1984 | Lin et al. | 382/147 |
| 4,472,786 | A | * | 9/1984 | Larson | 364/822 |
| 4,493,420 | A | | 1/1985 | Dennis | 209/587 |
| 4,519,041 | A | | 5/1985 | Fant et al. | 364/552 |
| 4,532,650 | A | | 7/1985 | Wihl et al. | 382/8 |
| 4,547,897 | A | | 10/1985 | Peterson | 382/8 |
| 4,555,770 | A | * | 11/1985 | Sage | 364/819 |
| 4,570,180 | A | * | 2/1986 | Baier et al. | 382/145 |
| 4,578,812 | A | * | 3/1986 | Yui | 382/300 |
| 4,581,762 | A | * | 4/1986 | Lapidus et al. | 382/141 |
| 4,589,140 | A | * | 5/1986 | Bishop et al. | 382/148 |
| 4,658,372 | A | * | 4/1987 | Witkin | 364/572 |
| 4,685,143 | A | | 8/1987 | Choate | 382/25 |
| 4,692,943 | A | * | 9/1987 | Pietzsch et al. | 382/148 |
| 4,750,180 | A | | 6/1988 | Doyle | 371/67 |
| 4,758,888 | A | | 7/1988 | Lapidot | 358/106 |
| 4,783,829 | A | | 11/1988 | Miyakawa et al. | 382/22 |
| 4,817,184 | A | | 3/1989 | Thomason et al. | 382/8 |
| 4,950,296 | A | | 8/1990 | McIntyre | 623/16 |
| 5,003,615 | A | | 3/1991 | Seitz | 382/22 |
| 5,086,478 | A | | 2/1992 | Kelly-Mahaffey et al. | 382/8 |
| 5,146,509 | A | | 9/1992 | Hara et al. | 382/8 |
| 5,204,910 | A | | 4/1993 | Lebeau | 382/8 |
| 5,432,712 | A | | 7/1995 | Chan | 364/514 R |
| 5,434,802 | A | | 7/1995 | Matsumoto | 364/559 |
| 5,495,535 | A | | 2/1996 | Smilansky et al. | 382/145 |
| 5,513,275 | A | | 4/1996 | Khalaj et al. | 382/149 |
| 5,570,298 | A | | 10/1996 | Suzuki et al. | 364/525 |
| 5,586,058 | A | | 12/1996 | Aloni et al. | 364/552 |
| 5,619,429 | A | | 4/1997 | Aloni et al. | 364/552 |
| 5,754,690 | A | | 5/1998 | Jackson et al. | 382/199 |
| 5,774,572 | A | * | 6/1998 | Caspi et al. | 382/141 |
| 5,774,573 | A | * | 6/1998 | Caspi et al. | 382/141 |
| 5,796,868 | A | | 8/1998 | Dutta-Choudhury | 382/199 |
| 5,943,441 | A | | 8/1999 | Michael | 382/199 |
| 5,987,172 | A | | 11/1999 | Michael | 382/199 |
| 6,005,978 | A | | 12/1999 | Garakani | 382/218 |
| 6,141,040 | A | | 10/2000 | Toh | 348/126 |

OTHER PUBLICATIONS

Joyce Lawrence et al., "Precision bounds in superresolution procession," Journal of the Optical Society of America A, Optics and Image Science, Optical Society of America, vol. 1, No. 2, Feb. 1984, pp. 149–168.

Chapron Michel "A New Chromatic Edge Detector Used for Color Image Segmentation," Proceedings of the 11$^{th}$ IAPR International Conference on Pattern Recognition, The Hague, The Netherlands, IEEE, vol. III, Aug. 30–Sep. 3, 1992, Conference C: Image, Speech, and Signal Analysis, France, pp. 311–314.

Marr, D., et al., "Theory of edge detection," Proceeding of Royal Society London, B 207, pp. 187–217, 1980.

Ullman Shimon "A Very High Speed, Very Versatile Automatic PCB Inspection System," presented in Washington, D.C., Printed Circuit World Convention III, May 22–25, 1984, pp. 1–8.

Haralick Robert M. "Edge and Region Analysis for Digital Image Data," Computer Graphics and Image Processing, Academic Press, Inc., vol. 12, No. 1, Jan. 1980, pp. 60–73.

Okuyama H. et al., "High–speed digital image processor with special–purpose hardware for two–dimensional convolution," Review of Scientific Instruments, American Institute of Physics, vol. 50, No. 10, Oct. 1979, pp. 1208–1212.

Shafarenko Leila et al., "Automatic Watershed Segmentation of Randomly Textured Color Images," IEEE Transactions on Image Processing, IEEE, vol. 6, No. 11, Nov. 1997, pp. 1530–1544.

Shanmugam, Sam K. et al., "An Optimal Frequency Domain Filter for Edge Detection in Digital Pictures," IEEE Transactions on Pattern Analysis and Machine Intelligence, IEEE, vol. PAMI–1, No. 1, Jan. 1979, pp. 37–49.

Mammone R. et al., "Superresolving image restoration using linear programming," Applied Optics, Optical Society of America, vol. 21, No. 3, Feb. 1, 1982, 496–501.

Comaniciu Dorin et al., "Robust Analysis of Feature Spaces: Color Image Segmentation," Proceedings of the 1997 IEEE Computer Society Conference on Computer Vision and Pattern Recognition, Jun. 17–19, 1997, IEEE Computer Society, pp. 750–755.

Pujas Phillippe, et al., "Robust Colour Image Segmentation," Laboratoire d'Informatique, de Robotique et de Microelectronique de Montpellier Universite Montpellier II/CNRS, France, pp. 1–14.

Canny John Francis "Finding Edges and Lines in Images," Master of Science Thesis, Massachusetts Institute of Technology, Jun. 1983 (entire thesis submitted, pp. 1–145).

Gonzalez Rafael C., et al., "Digital Image Processing," Addison–Wesley Publishing Company, Inc., 1992, Chapters 7 & 8, pp. 413–570.

Russ John C. "The Image Processing Handbook," 2$^{nd}$ Edition, CRC Press, Inc., 1995, Chapters 6 & 7, pp. 347–480.

Davis, Larry S. "A Survey of Edge Detection Techniques," Computer Graphics and Image Processing, Academic Press, Inc., vol. 4, 1975, pp. 248–270.

"Orbot PC–20 Automatic Visual Inspection of PC Boards in Seconds," Literature published by Orbot Systems, Ltd., 1984, 6 pages.

* cited by examiner

FIG. 5
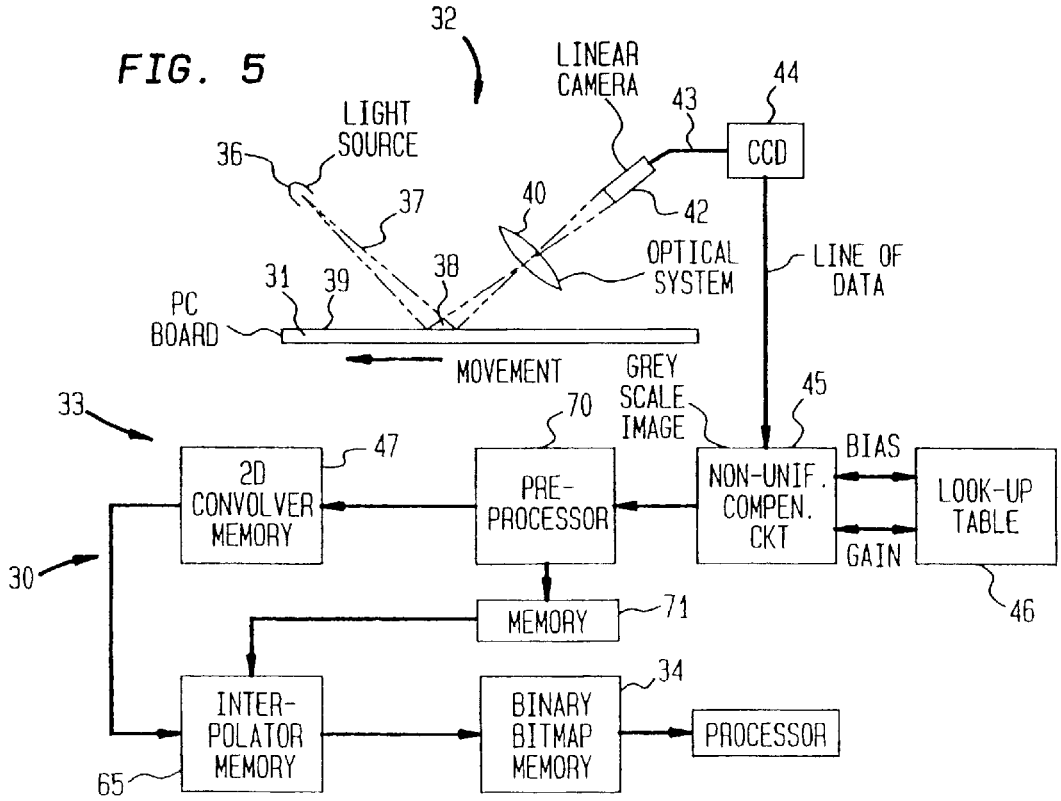
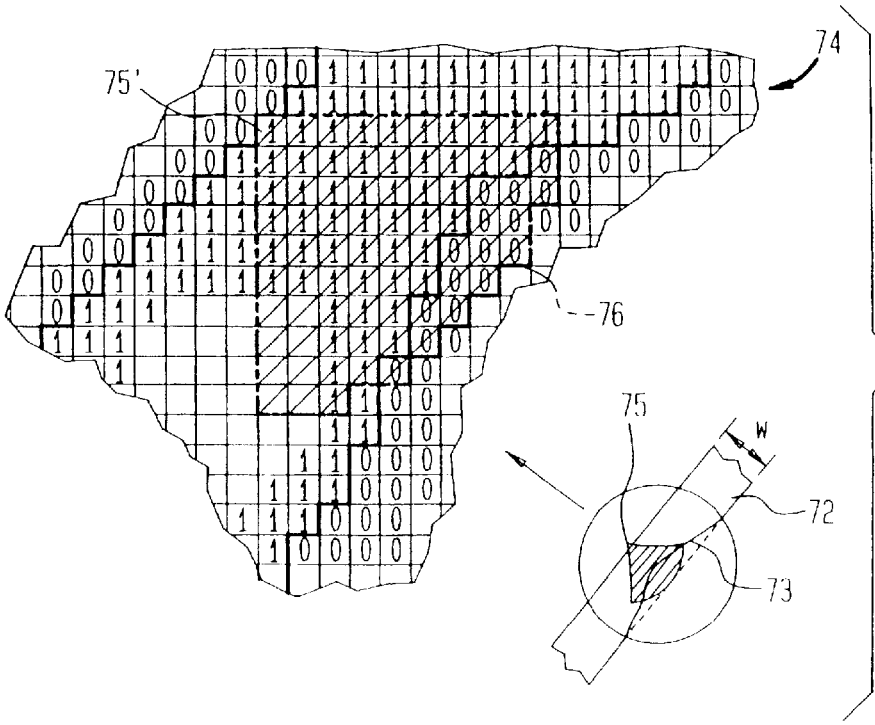
FIG. 9

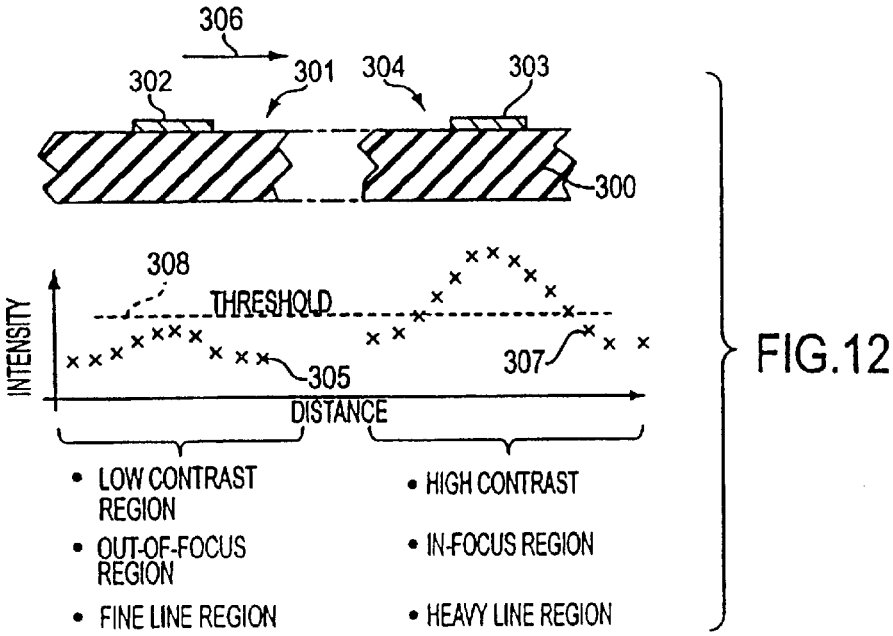
FIG.12
FIG. 13
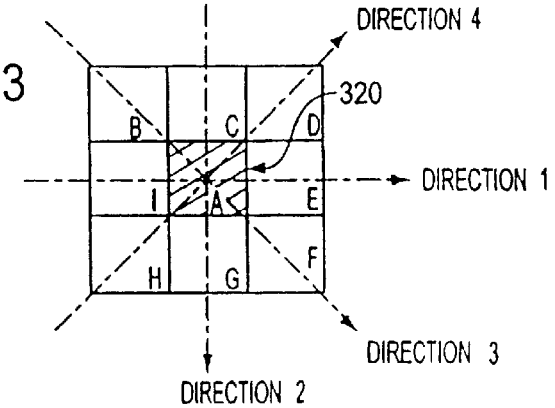
FIG. 14
(AMENDED)
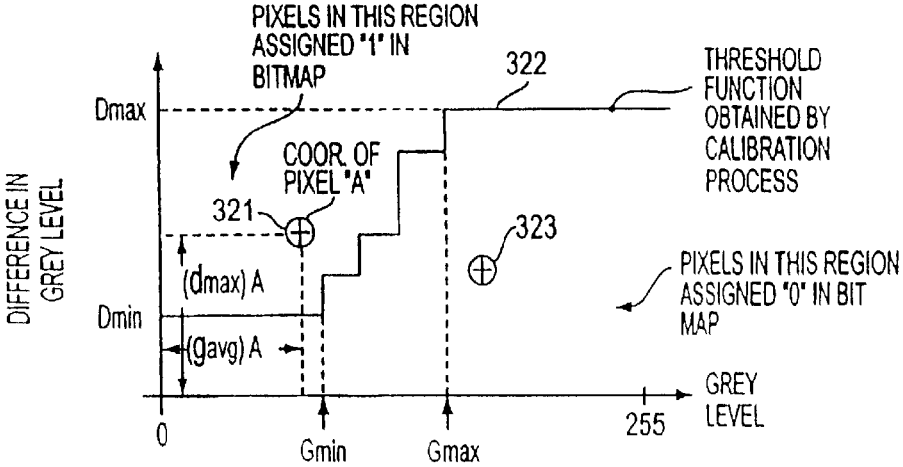

FIG. 21
(AMENDED)
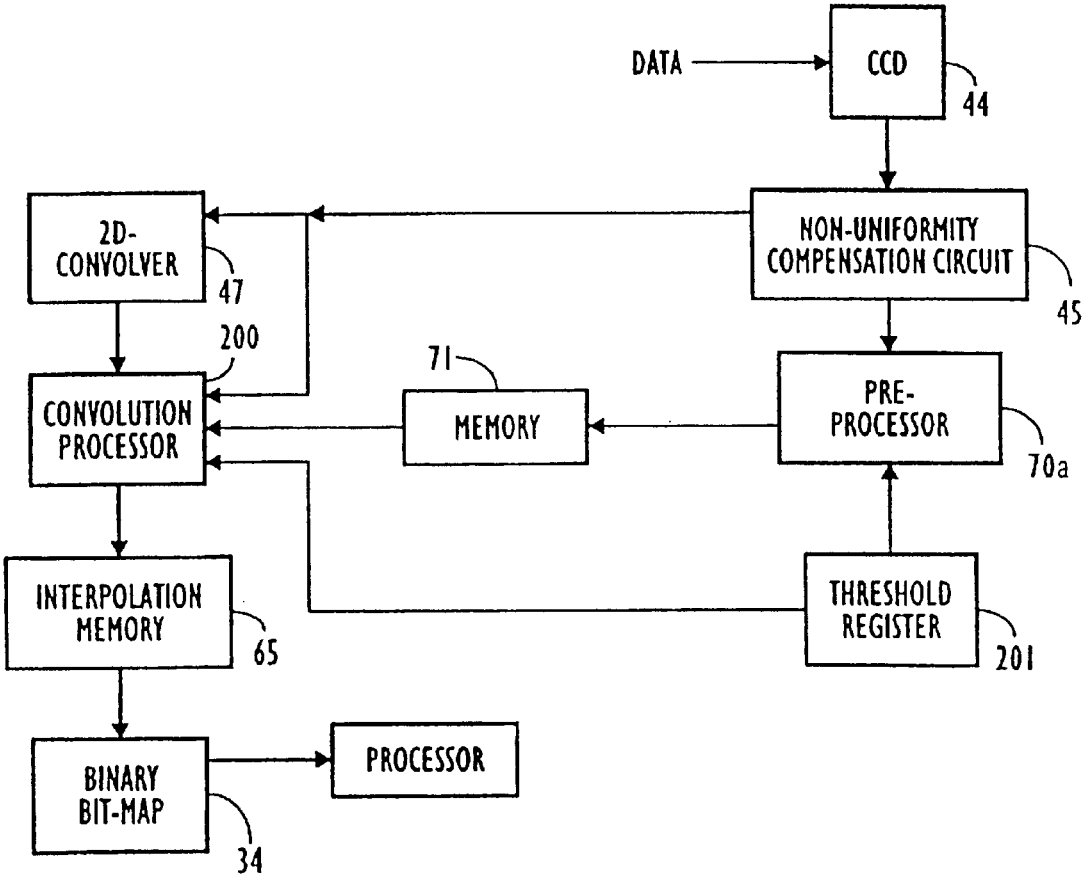

FIG. 24
(AMENDED)
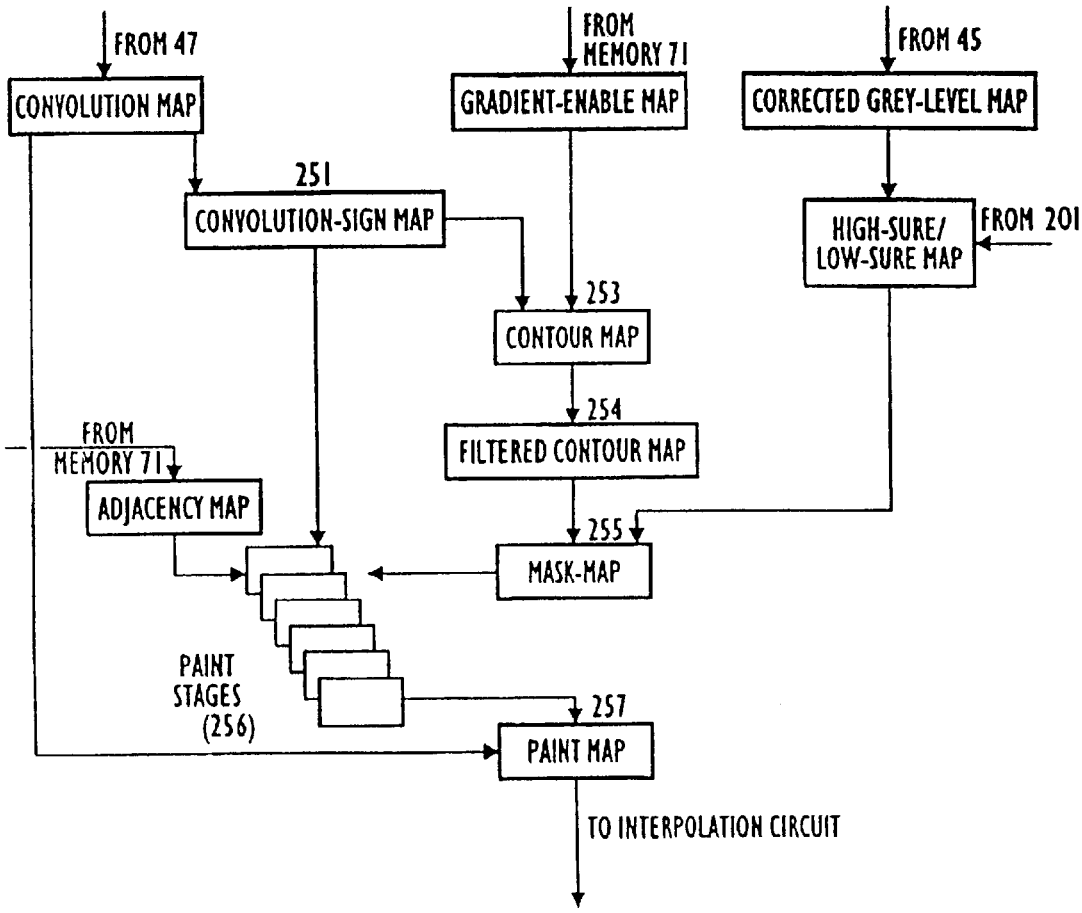

FIG. 25
(AMENDED)
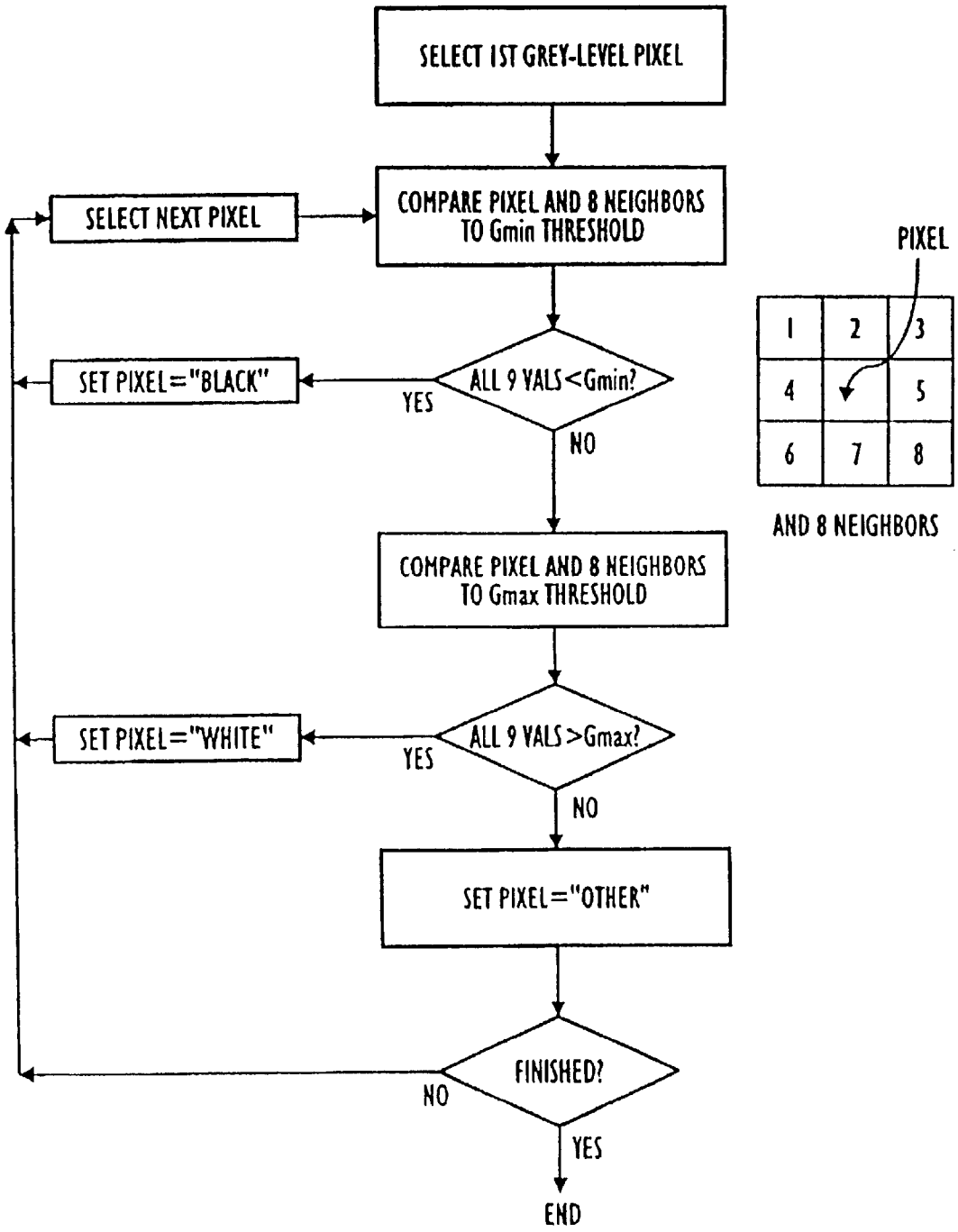

FIG. 27
(AMENDED)
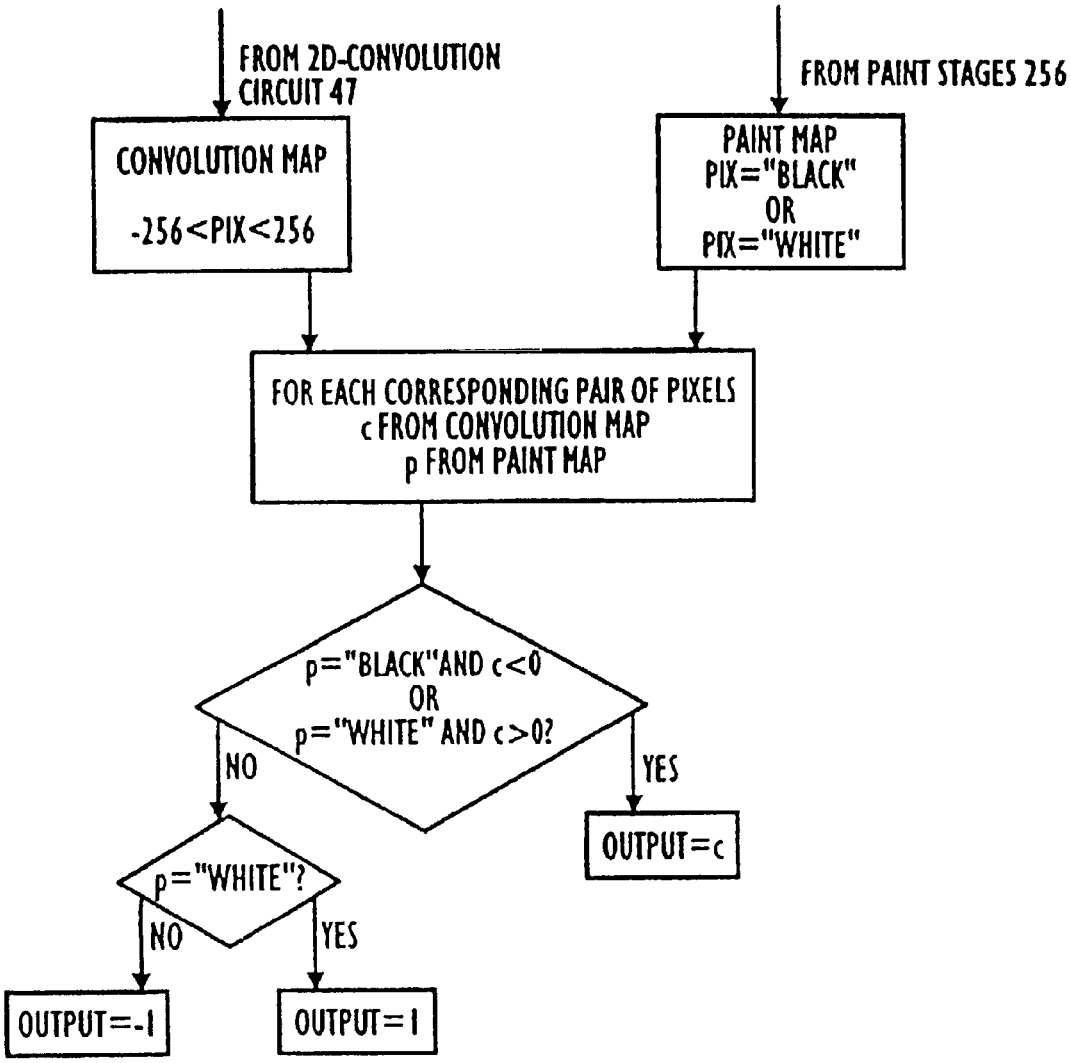

AUTOMATIC VISUAL INSPECTION SYSTEM

Matter enclosed in heavy brackets [ ] appears in the original patent but forms no part of this reissue specification; matter printed in italics indicates the additions made by reissue.

RELATED APPLICATIONS

This application is a continuation-in-part of application Ser. No. 061,344 filed May 17, 1993, now U.S. Pat. No. 5,774,572, which is a continuation of application Ser. No. 961,070 filed Oct. 14, 1992 (now abandoned), which is a continuation of application Ser. No. 804,511 filed Dec. 10, 1991 (now abandoned), which is a continuation of application Ser. No. 684,583 filed Dec. 20, 1984 (now abandoned). The subject matter in the parents of the present application is hereby incorporated by reference.

TECHNICAL FIELD OF THE INVENTION

This invention relates to automatic visual inspection systems, and more particularly to systems for inspecting printed circuit boards, hybrid boards, and integrated circuits.

BACKGROUND OF THE INVENTION

In its simples form, a printed circuit board or panel comprises a non-conductive substrate on one or both surfaces of which are deposited conduit tracks or lines in a pattern dictated by the design of the electronic equipment supported by the board. More complex boards are constructed by laminating a number of single panels into a composite or multi-layered board; and the use of the latter has increased dramatically in recent years and an effort to conserve space and weight.

As component size has shrunk, component density on boards has increased with the result that line size and spacing have decreased over the years. Because of the "fine geometry" of modern boards, variations in line width and spacing have become more critical to proper operation of the boards. That is to say, minor variation in line thickness or spacing have a much greater chance to adversely affect performance of the printed circuit board. As a consequence, visual inspection, the conventional approach to quality control, has employed visual aids, such as magnifiers or microscopes, to detect defects in a board during its manufacturer. Such defects would include line width and spacing, pad position relative to hole location, etc. Unfortunately, visual inspection is a time consuming, tedious task that causes operator fatigue and consequential reduction in consistency and reliability of inspection, as well as throughput.

Because multi-layered boards cannot be tested electrically before lamination, visual inspection of the component panels of a multi-layered board before lamination is critical. A flaw in a single layer of an assembled board can result in scrapping of the entire board, or involve costly, and time consuming rework. Thus, as board complexity and component density and production requirements have increased, automation of manufacturing processes has been undertaken. However, a larger and larger fraction of the cost of producing boards lies in the inspection of the boards during various stages of manufacture.

Automatic visual inspection techniques have been developed in response to industry needs to more quickly, accumulately and consistently inspect the printed circuit boards. Conventional systems include an electro-optical sub-system that intensely illuminates a board being inspected along a narrow strip perpendicular to the linear displacement of the board through the system, and a solid state camera that converts the brightness of each elemental area of the illuminated strip, termed a pixel, to a number representative of such brightness; and the number is stored in a digital memory. Scanning of the entire board is achieved by moving the board relative to the camera. The result is a grey scale image of the board, or part of the board stored in memory. A relatively small number in a cell of the memory represents a relatively dark region of the object (i.e., the substrate), and a relatively large number represents a brighter portion of the object, (i.e., a conductive line).

The contents of the memory are processed for the purpose of determining the location of transitions between bright and dark regions of the object. Such transitions represent the edges of lines and the processing of the data in the digital memory is carried out so as to produce what is termed a binary bit map of the object which is a map of the printed circuit board in terms of ZERO's and ONE's, where the ONE's trace the lines on the printed circuit board, and the ZERO's represent the substrate. Line width and spacing between lines can then be carried out by analyzing the binary map.

The time required to scan a given board, given a camera with a predetermined data processing rate, typically 10–15 MHz, will depend on the resolution desired. For example, a typical camera with an array of 2048 photodiodes imaging a board is capable of scanning a one inch swarth of the board in each pass if a resolution of ½ mil is required. At 0.5 mil resolution, a swath one inch wide is composed of 96 million pixels. Assuming camera speed of 10 MHz, about 10 seconds would be required for completing one pass during which data from one swath would be acquired. If the board were 18 inches wide, then at least 18 passes would be required to complete the scan of the board. More than 18 passes is required, however, to complete a scan of the board because an overlap of the passes is required to insure adequately covering the "seams" between adjacent passes. Combined with overhead time required, e.g., the time required to reposition the camera from swath to swath, data acquisition time becomes unacceptably large under the conditions outlined above.

The basic problems with any automatic visual inspection system can be summarized in terms of speed of data acquisition, amount of light to illuminate the board, and the depth of field of the optical system. Concomitant with increased requirements for reducing pixel size (i.e., increasing resolution) is an increase in the amount of light that must be supplied to a pixel to maintain the rate of data acquisition. Physical constraints limit the amount of light that can be concentrated on the printed circuit boards so that decreasing the pixel size to increase resolution and detection variations in line width or spacing of "fine geometry" boards, actually slows the rate of data acquisition. Finally, decreasing pixel size, as resolution is increased, is accompanied by a reduction in the depth of field which adversely affects the accuracy of the acquired data from board to board.

It is therefore an object of the present invention to provide a new and improved automatic visual inspection system which is capable of acquiring data faster than conventional automatic visual inspection systems, and/or reducing the amount of illumination required for the board, and increasing the depth of field.

It is a further object of the present invention to provide a new and improved automatic visual inspection system which is capable of accurately interpreting information when the object being inspected has regions of different contrast, precision of focus, and other surface conditions.

BRIEF DESCRIPTION OF INVENTION

According to the present invention, a binary map of an object having edges is produced by first producing a digital grey scale image of the object with a given resolution, and processing the grey scale image to produce a binary map of the object at a resolution greater than said given resolution. If the ultimate resolution required is, for example, one mil (0.001 inches), then, the resolution of the digital grey scale image can be considerably less than one mil, and may be, for example, three mils. The larger than final pixel size involved in acquiring data from an object permits objects to be scanned faster, and either reduces the amount of light required for illuminating the objects or permits the same amount of light to be used thus decreasing the effect on accuracy of noise due to statistical variations in the amount of light. Finally, increasing the pixel size during data acquisition improves the depth of field and renders the system less sensitive to variations in the thickness of the boards being tested.

Processing of the grey scale image includes the step of convolving the 2-dimensional digital grey scale image with a filter function related to the second derivative of a Gaussian function forming a 2-dimensional convolved image having signed values. The location of an edge in the object is achieved by finding zero crossings between adjacent oppositely signed values. Preferably, the zero crossings are achieved by an interpolation process that produces a binary bit map of the object at a resolution greater than the resolution of the grey scale image. The nature of the Gaussian function whose second derivative is used in the convolution with the grey scale image, namely is standard deviation, is empirically selected in accordance with system noise and the pattern of the traces on the printed circuit board such that the resulting bit map conforms as closely as desired to the lines on the printed circuit board.

The convolution can be performed with a difference-of-two-Gaussians, one positive and one negative. It may be achieved by carrying out a one-dimensional convolution of successive lines of the grey scale image to form a one-dimensional convolved image, and then carrying out an orthogonal one-dimensional convolution of successive lines of the one-dimensional convolved image to form a two-dimensional convolved image. Each one-dimensional convolved image may be formed by multiple convolutions with a boxcar function.

Detection of the presence of lines less than predetermined minimum width can be accomplished, independently of the attitude of the lines in the bit map by superimposing on an edge of a line, a quadrant of a circle whose radius is the minimum line thickness. By ANDing he contents of pixels in the bit map with ONE's in the corresponding pixels in the superposed quadrant the production of a ZERO indicates a line width less the predetermined width. A similar approach can be taken to detect line spacings less than a predetermined minimum. One quadrant is used for lines and spaces whose are oriented on the board lies between 0° and 90°, and another quadrant is used for orientations between 90° and 180°.

The processing of the grey scale image by convolving with the filter function of the present invention produces a binary map of the object in terms of transitions between brighter and dimmer elements in the object. To complete the map, the non-transition pixels must be assigned binary values that match the nature of the homologous pixels in the object. That is to say, all of the pixels that define traces should have the same binary value, and all of the pixels that define the substrate have the opposite binary value.

The present invention utilizes a threshold function in establishing an attribute of each pixel in the grey scale object. Such attribute assists in the assignment of binary values to the pixels in the binary map of the object. In one aspect of the invention, the threshold function is a constant function of grey level and is location independent, and in another aspect of the invention, the threshold function is a non-constant function of grey level and is location dependent.

BRIEF DESCRIPTION OF DRAWINGS

An embodiment of the present invention is shown in the accompanying drawings wherein:

FIG. 5 is a block diagram schematically illustrating the automatic visual inspection system according to the present invention;

FIG. 9 is an enlarged view of a bit map for the purpose of illustrating a line having a width less than the prescribed width, and the manner in which detection of this defect is achieved using a quadrant whose radius is equal to the prescribed minimum line width.

FIG. 12 is a cross-section of a typical printed circuit board showing conductive traces in regions of different contrast between a conductive track and the substrate, and showing the effect on the measured reflectance;

FIG. 13 shows a 3×3 matrix of pixels in which the pixel under consideration is the center pixel, and showing the four directions involved in obtaining an ordered pair of numbers for the center pixel;

FIG. 14 is the grey-level-difference/grey-level plane showing the relationship between the coordinates of a given pixel in this plane and a threshold function obtained during a calibration operation for the purpose of assigning an attribute to the pixel;

FIG. 21 is a block diagram of a second embodiment of the present invention for binarization of a grey level map;

FIG. 24 is a flow chart showing the operational features of convolution processor 200 in FIG. 21:

FIG. 25 is a flow chart showing the steps in obtaining the high-sure/low map in FIG. 24;

FIG. 27 is a flow chart showing the steps in the final revision of the convolution map.

DETAILED DESCRIPTION

Figure 1:
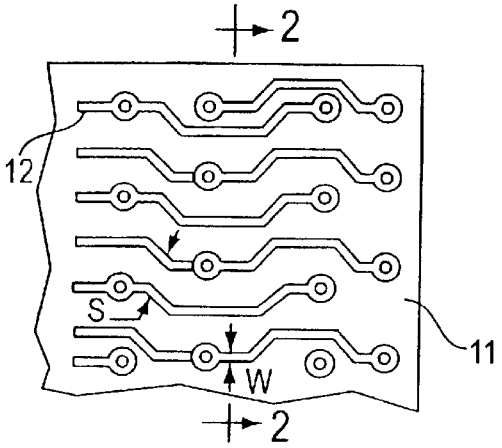
FIG. 1 is a plan view of a segment of a typical printed circuit board.
Figure 2:
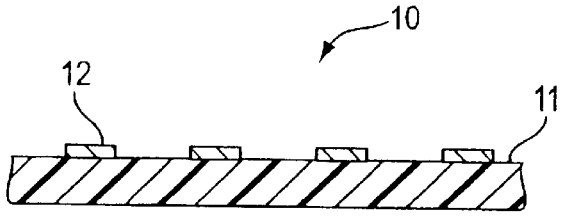
FIG. 2 is a section taken along the line 2—2 of FIG. 1 showing a cross section of the printed circuit board in FIG. 1.

Referring now to the drawing, reference numeral 10 designates a conventional printed circuit board comprising substrate 11 on one surface of which are deposited conductive tracks or lines 12 in a manner well known in the art. A typical board may have 3 mil lines, and spacing between lines of a comparative dimension.

Figure 3:
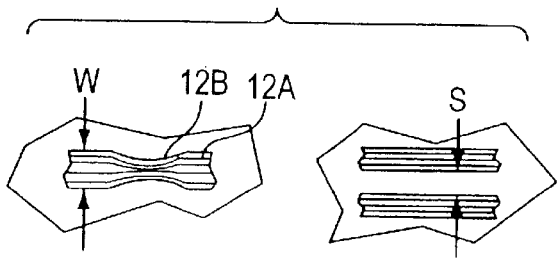
FIG. 3 shows two portions of a printed circuit board for the purpose of illustrating a line of reduced width and for illustrating the spacing between adjacent lines.

As is well known, the technique of depositing lines 12 on substrate 11 involves a photographic and etching process which may produce a result shown in FIG. 3 where line 12a, of width w has a reduced portion at 12b. The cross section available for conduction in reduced portion 12b may be insufficient to permit proper operation of the electronic components associated with the printed circuit board; and for this reason a board having a line of a width less than some predetermined value would be rejected, or at least noted. As boards get more and more complex, detecting breaks in lines, or lines with reduced width, becomes more and more difficult.

The photoetching process involved in producing lines on a printed circuit board sometimes results in the spacing s being less that the design spacing. In such case, quality control should reject the board or note the occurrence of a line spacing less than the specified line spacing.

Figure 4:
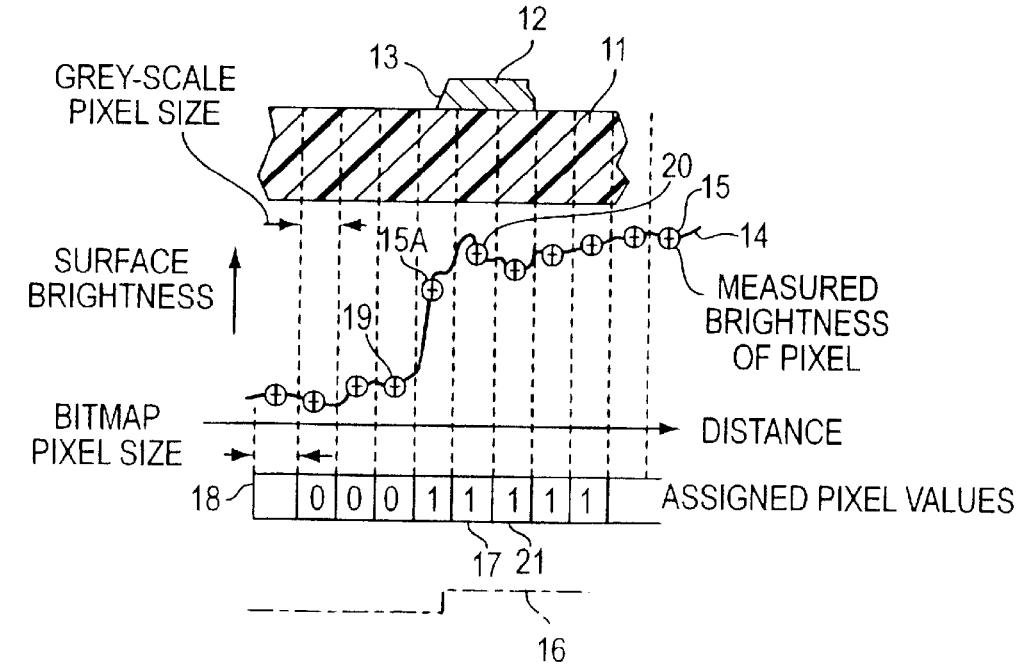
FIG. 4 PRIOR ART
FIG. 4 is a composite view of a portion of a grey scale image of a printed circuit board for the purpose of showing the effect of an edge on the grey scale image, and showing the bit map values for the section illustrated.

In order to achieve these and other ends, conventional automatic visual inspection systems will produce the results shown in FIG. 4. That is to say, a greyscale image of the printed circuit board will be obtained and stored in a digital memory, the resolution of the grey scale image being selected to be consistent with the accuracy with which measurements in the image are to be made. Thus, if the requirements is for measuring the edge 13 of a trace to within say 1 mil, then the resolution of the grey scale image should be less than that, say 0.5 mil.

Curve 14 in FIG. 4 illustrates the variation in brightness of pixels measured by the electro-optical system of a conventional visual inspection system, the continuous analog values designated by curve 14 being converted to discrete values by a sampling process which stores a number in a homologous cell of a digital memory. The discrete values are indicated by circled-pluses in FIG. 4 and are designated by reference numerals 15. Typically, due to noise and statistical variations in the amount of light incident on the printed circuit board, and other factors, edge 13 will cause curve 14 to vary continuously from a generally lower level indicated by data points 19 to a generally upper level as indicated by data points 20, rather than to jump, in a discontinuous manner, from one level to the other. Thus, edge 13 is not sharply defined.

Conventionally, an algorithm is used for the purpose of determining within which pixel an edge will fall and this is illustrated by the assigned pixel values in vector 18 as shown in FIG. 4. That is to say, value 15a is assumed to exceed a predetermined threshold; and where this occurs, a bit map can be established based on such threshold in a manner illustrated in FIG. 4. Having assigned binary values to the bit map, the edge is defined as illustrated by curve 16 in FIG. 4.

One of the problems with the approach illustrated in FIG. 4 is the manner in which the bit in position 17 in bit map vector 18 is assigned. The precise location of the transition from the printed circuit board, as indicated by measured brightness value 19 to a line indicated by measure value 20, depends on the value at 15A and the size of the pixels.

In other words, for a given pixel size, identifying the transition as occurring at location 17 in the bit map rather than at adjacent location 21, depends upon the selected threshold. Note that the pixel size of the grey scale image in the prior art is the same as the pixel size in the bit map.

The present invention contemplates using larger pixels to acquire the grey scale image of the printed circuit board than are used in constructing the bit map while maintaining resolution accuracy. Using relatively large pixels to acquire the data increases the area scanned by the optical system in a given period of time as compared to the approach taken with a conventional device. This also increases the amount of light incident on each pixel in the object thus decreasing the effect of noise due to statistical variations in the amount of light incident on the pixel. Finally, this approach also increases the depth of field because of the larger pixel size accommodating larger deviations in board thickness.

Apparatus in accordance with the present invention is designated by reference numeral 30 and is illustrated in FIG. 5 to which reference is now made. Apparatus 30 is designed to produce a binary bit map of printed circuit board 31 which has lines thereon defining edges as shown in FIG. 1. Apparatus 30 comprises a conventional electro-optical subsystem 32 for producing data representative of the brightness of the surface of printed circuit board 31, and processing means 33 for processing the data and producing binary bit map stored in memory 34. Board 31 is mounted for linear displacement in the direction indicated by arrow 35, the mechanism for effecting the movement being conventional and not forming a part of the present invention. For example, movable tables are available having vacuum tops by which the printed circuit board is clamped for movement by the table.

Linear light source 36, shown in cross-section in FIG. 5, produces high intensity beam 37 which illuminates strip 38 on surface 39 of the printed circuit board, strip 38 being oriented in a direction perpendicular to the direction of movement of the board. Light from the strip is focused by optical system 40 onto a linear array of photodectors 42 each of whose instantaneous outputs on bus 43 is representative of the number of light photons incident on the photosensitive area of a photodetector. The outputs of the photodetectors are integrated over time, for example, by a linear array of charge-coupled-detectors (CCD's) 44 on which charge is accumulated in proportion to the amount of light incident on the photodetectors, and the time of accumulation which is established by the sampling of the CCD's. In other words, after a predetermined amount of time dependent upon the intensity of light source 36 and the speed of movement of board 31 and the optical condition of surface 39 of the printed circuit board, each CCD in array 44 will have a charge whose magnitude is proportional to the brightness of an elemental area on strip 38 within the field of view of the particular photodetector connected to the CCD. Upon sampling of the CCD's after such predetermined time, the values of the charges on the linear array of CCD's 44 are transferred, to compensation circuit 45. The arrangement is such that data corresponding to the brightness of each pixel in the object is sequentially examined by compensation circuit 45, and a correction is applied to each value to compensate for individual response of the various photodiodes in array 42. The need for such compensation arises because the outputs of photodetectors 42, when a uniformly bright object is scanned, will in general, not be equal. The variation in outputs from pixel to pixel in the line of data applied to circuit 45, when the object is uniformly bright, is due to difference in the gain and the response slopes of the photodetectors. By carrying out a calibration process that involves scanning a uniformly bright object, a look-up table of correction factors for the output of each photodetector can be stored in memory 46. In this way, a correction of unavoidable non-uniformities in the illumination and corrections for the bias and the gain differences for the output of each photodetector can be applied to the data being supplied to circuit 45 thus eliminating variations in the electrical responses of the photodetectors.

The output of circuit 45, which is serial, is a representation of the grey scale image of the object, namely surface 39 of board 31. This grey scale image is developed line by line as board 31 is moved with respect to the electro-optical sub-system 32. The function of preprocessor 70 is deferred; and at this time, it is sufficient to state that the digital values of the brightness of the elemental areas of the object are stored in a digital memory that is a part of convolver 47 whose operation is detailed below.

Figure 6:
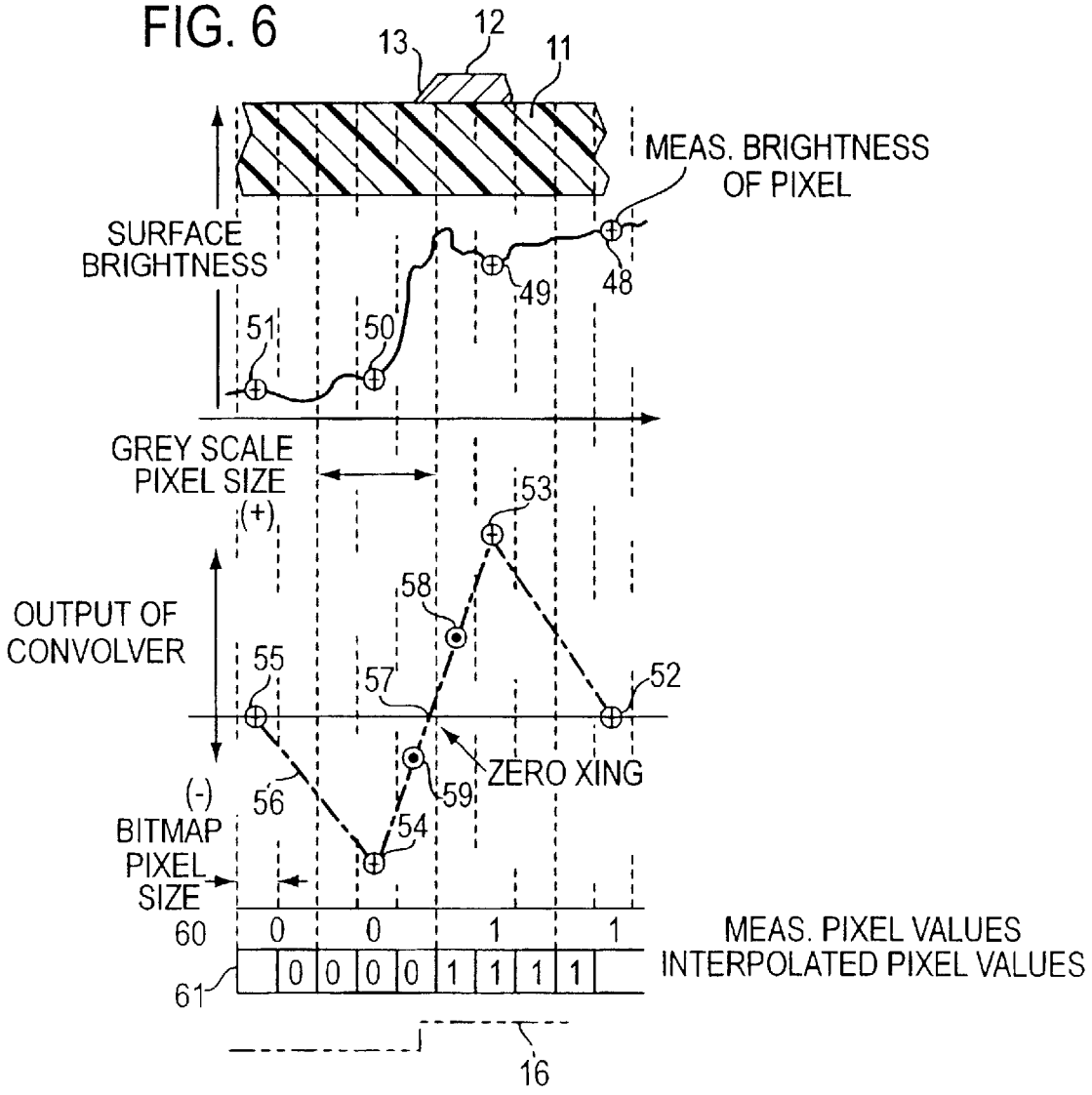
FIG. 6 is a composite view similar to that of FIG. 4 but illustrating the variation in grey scale values resulting from an edge of a line on a printed circuit board, and showing the distribution of the signed values of the convolved image as well as the values of the bits assigned to the bit map for both the measured and interpolated pixel values.

Referring at this time FIG. 6, sampled data points 48, 49, represent the brightness of pixels on board 11, such pixels being 9-time larger in area than the sampled pixels according to the prior art as shown in FIG. 4. This tripling of the pixels dimension is for purposes of illustrating the present invention and should not be considered as a limitation because the pixel size could be made any multiple of the pixel size shown in FIG. 4. For example, the increase in pixel size could be by a factor of 5 or even 10 times. That is to say, the resolution of the grey scale image obtained according to the present invention is ⅓ or less than the resolution of the grey scale image of a conventional system. Although, as indicated below, the image with the larger pixels appear more blurred than the image with smaller pixels, the processing carried out by convolver 47 properly locates edges of lines on the printed circuit board. However, because the pixel size is increased over that as shown in FIG. 4, the speed of scanning can be increased by the square of the factor that the resolution is decreased, or the amount of light could be reduced and achieve the same scanning rate. In addition, the undersampling achieved with the present invention beneficially effects the field of depth of the optical system with the result that the grey scale image is less sensitive to variations in printed circuit board thickness as different printed circuit boards are scanned, or to variations in height within the same board itself.

Convolver 47 carries out, on the digital data representative of the grey scale image of the printed circuit board, a two-dimensional convolution with the second derivative of a Gaussian function, or an approximation thereof, producing in the associated memory of the convolver, a convolved image of the object having signed values. FIG. 6 shows a one-dimensional convolution of the measured grey scale image represented by data points 48–51 producing the signed values 52–55 shown in FIG. 6. In other words, the convolved one-dimensional image has essentially zero values indicated by data points 52 and 55 at all locations where the brightness of the grey scale image is substantially constant (i.e., regions of the substrate and regions of a line). Thus, the one-dimensional convolved image of the printed circuit board will have values close to zero throughout the image except at the edge of a line. Such an edge is indicated in the one-dimensional convolved image by transitions that have large excursions above and below a zero level as indicated in FIG. 6 by data points 53 and 54. The actual location of the edge is determined by the zero crossing of the signed values of the convolved image. The crossing is closely related to the location where linear curve 56 connecting data points 52–55 crosses the zero axis, the crossing point being indicated by reference numeral 57.

The precise location of the zero crossing need not be determined, only the pixel within which the crossing occurs is necessary. In order to make a direct comparison with the conventional technique illustrated in FIG. 4, the number of pixels in the bit map that will be reproduced using the convolved image is increased to correspond to the number of pixels in the bit map used with the conventional apparatus. Thus, while data points 63 and 54 are measured data points, intermediate points 58, 59, equally spaced between the measured data points, can be found by a linear interpolation operation. The problem of finding the zero crossing is simplified because, as explained below, identification of the pixel in which the zero-crossing occurs is achieved by a comparison of the values of data points 53 and 54.

Figure 7:
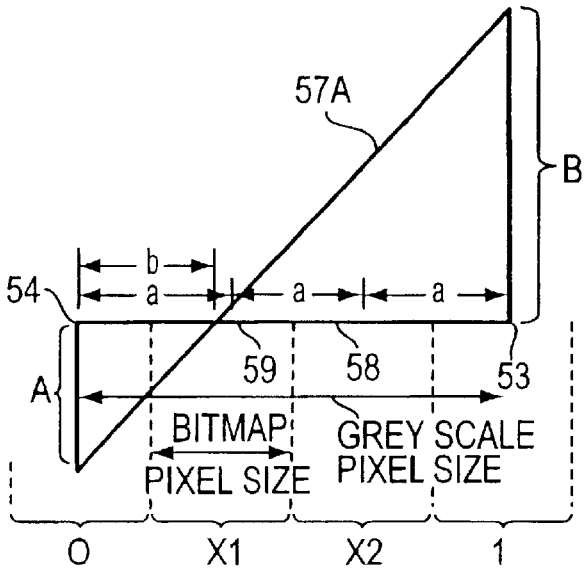
FIG. 7 is a sketch illustrating the manner for identifying the pixel containing the zero crossing between adjacent oppositely signed values of the convolved image.

Reference is now made to FIG. 7 which illustrates the manner in which a comparison is made between the signed data points for the purpose of locating that pixel containing the zero crossing of the convolved image. Recalling that the distance between measured data points is divided into a number of intervals to reduce pixel size in the bit map (in this example, the pixel dimension in the bit map is ⅓ of the dimension in the grey scale image), location of the zero crossing involves identifying pixel in which the zero crossing occurs. Inspection of FIG. 7 reveals that, by reason of similarity of triangles:

$$A/B=b/(3a-b) \quad (1)$$

where where the quantity A represents the magnitude of the convolved image at 54, B represents the magnitude of the convolved image at data point 53, a represents the dimension of a pixel, and b represents the distance of the zero crossing from data point 54. The object of this exercise is to assign a binary value to bits associated with data points 53 and 54, as well as the two interpolated data points 58 and 59. The binary values for data points 54 and 53 are known and they are ZERO and ONE respectively as shown in FIG. 7. What is unknown is the value associated with the interpolated data points 58 and 59, these values being indicated by the quantities $x_1$ and $x_2$. By inspection of Eq. (1), one can see that if b lies within the interval between zero and a as shown in FIG. 7, then 2A is less than or equal to B. In such case, the zero crossing would occur between data points 54 and 59 and the consequence is that both $x_1$ and $x_2$ should have the binary value 1. Similarly, if A is greater than or equal to 2B, then $x_1=0$ and $x_2=0$. Finally, if B/2<A2B, then $x_1=0$ and $x_2=1$. The nature of convolving with the derivative of the Gaussian is such that near a zero-crossing, the convolved image varies linearly. Therefore, the interpolation can be carried out quickly and simply. In order to determine the binary value for the final bit map from the convolved image, two rather simple arithmetic computations are carried out on adjacent oppositely signed values in the convolved image. Assignment of bit map values is dependent upon the inequalities discussed above.

Below curve 56 in FIG. 6 are two binary vectors, the vector at 60 representing the binary values that result from the original grey scale image of the printed circuit board. Vector 61, on the other hand, is obtained using the technique described above using the interpolated pixel values. The combined vectors produce the same vector as vector 18 shown in FIG. 4 and also represent the curve 16 as indicated in FIG. 6.

Figure 8:
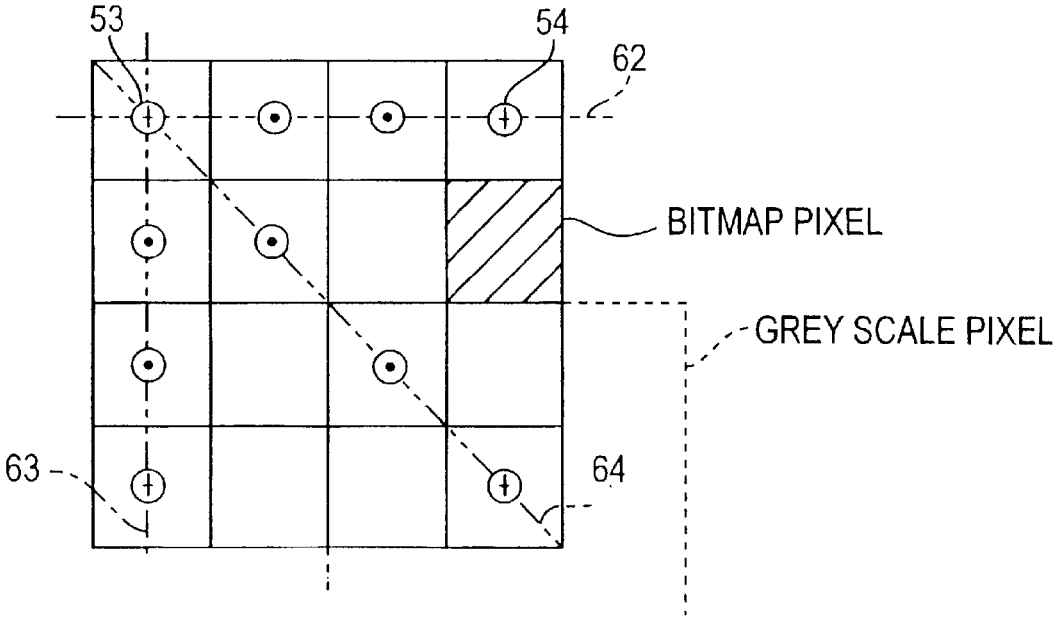
FIG. 8 is a plan view of a number of pixels illustrating how the interpolation process is carried out in two-dimensions.

In actual practice, a two-dimensional convolution of the grey scale image with a two-dimensional second derivative of a Gaussion is carried out. The result is a two-dimensional convolved image of signed values; and interplation is carried on this convolved image as indicated in FIG. 8 which shows measured data at points designated by circled-pluses, and interplated data points designated by circled-dots. Interpolation is carried out in orthogonal directions 62–63 and along diagonal 64 which bisects the orthogonal directions. In each case, the interpolation identifies that pixel within which the zero crossing has occurred in two orthogonal directions and along a diagonal. This process is carried out point-by-point to complete the binary map.

Returning now to FIG. 5, interpolator and memory 65 carries out the operation described above on the two-dimensional convolved image produced by convolver 47. The interpolation process produces binary bit map 34 having pixel sizes that are the same as the binary bit map produced by the conventional approach taken in FIG. 4. However, the binary bit map in FIG. 5 can be obtained almost an order magnitude faster than the bit map following conventional procedures. Moreover, as indicated previously, the sensitivity of the apparatus to variations from board to board, and/or within the same board, to board thickness is less pronounced than in the conventional device because the enlarged pixel size for acquiring the data increases the depth of fields of the optical system.

As indicated previously, the signed values of the convolved image are different from essentially zero only in the vicinity of transitions or edges in the object image. No information is contained in the convolved image by which a determination can be made that a pixel containing an essentially zero value is derived from a pixel associated with the substrate or from a pixel associated with a line. Thus, the edges of lines can be accurately determined by the process and apparatus described above, but the attribute of pixels remote from an edge (e.g., pixels farther than the radius of the derivative of the Gaussian operator) is unknown. The purpose of pre-processor 70 is to furnish an attribute to interpolator 65 to enable it to assign a binary value to each bit of the bit map in accordance with whether its corresponding pixel is located in a line or in the substrate. Thus, pre-processor 70 applies to each pixel in the grey scale image a threshold test and stores in associated memory 71 a record that indicates whether the threshold is exceeded. The threshold will be exceeded only for pixels located in a line on the printed circuit board. When convolver 47 produces the convolved image of the grey scale image of the board, the address of each pixel lying in a line on the board is available from memory 71. Thus, the attribute of each pixel in the bit map can be established. It is determined directly by the convolution sign near a zero-crossing, and by the threshold test farther away from the zero-crossing. This is because unavoidable variations in contrast which always exist cause the threshold test to be inaccurate. This is particularly true near an edge transition where large variations in contrast exist. In the method described here, therefore, the threshold test is used only for pixels completely surrounded by dark or light areas. The attributes of pixels near the transition are determined, on the other hand, directly by the convolution sign.

The present invention also contemplates determining whether any line on the board has a portion with a thickness less than a predetermined value, regardless of the orientation of the line relative to the axes defining the pixel orientation. This result is achieved in the manner illustrated in FIG. 9 which shows inclined line 72 of width w on a board, the line having portion 73 of reduced width of less than a predetermined value. Fragment of bit map 74 shows line 72 as an island of ONE's in a sea of ZERO's. To determine the line width at point 75 on the line, pixel 75' in the bit map is located, and a quadrant of imaginary circle 76 of radius equal to the required line width is superimposed on the bit map, the apex of the quadrant being positioned at pixel 75'. The circle is defined by address offsets from selected pixel 75'. That is to say, given the address of a pixel on the edge of a line, the addresses of pixels within the boundary of circle 76 is known. If all of the pixels in the bit map within the boundary of circle 76 contain a ONE, then the width of the line at the selected point is no less than the required minimum line width. On the other hand, if any of the pixels within the boundary of circle 76 contain a ZERO, then the width of the line at the selected point is less than the required minimum. Note that the above description applies to line and space orientation between 0° and 180°.

In practice, analysis of line width can be carried out automatically by sequentially applying the principles set forth above to each point on the edge of a line. A record can be made of each pixel in the bit map at which a ZERO detection occurs in the offset address, and hence the coordinates of each point on the board having too narrow a line can be determined and stored. It should be noted that the technique disclosed herein is applicable to any line on the board at any orientation.

The principles described above are equally applicable to determining whether the spacing between lines is less than a predetermined minimum. In this case, however, the imaginary cycle is placed at at edge of a line such that it overlies the substrate, and the presence of a ONE in the offset addresses indicates reduced spacing.

The convolution function used in the present invention need not be a 2-dimensional function, and the convolution operation need not be carried out in one step. Rather, the function may be the difference of Gaussian functions, one that is positive, and one that is negative. The convolution operation can be carried out in two steps: convolving with the positive Gaussian function, and then convolving with the negative. Implementing this, the effect of convolution can be achieved by multiple convolving a a line of data in the grey scale image with a boxcar function in one dimension, and then convolving the 1-dimensional convolved image with a boxcar function in an orthogonal direction.

In order to facilitate two dimensional filtering, or the convolution operation as described above, apparatus 100 shown in FIG. 10 can be utilized. Apparatus 100 accepts a serial data stream from a scanned two dimensional function arranged in rows or columns with k elements per row or per column. Such a signal is generated by a camera as described above.

The operation of apparatus 100 is based on a mathematical theorem that states that a 1-dimensional convolution of a given function with a Gaussian function can be closely approximately by multiple 1-dimensional convolutions of the given function with a boxcar function (i.e., a function that is unity between prescribed limits and zero elsewhere). This procedure is described in Bracewell, R. N. The Fourier Transform and Its Applications, McGraw-Hill Inc., 1978, chapter 8. Application of this theorem and its implementation to the grey-scale image of the board is achieved in the present invention by apparatus 100 which comprises a plurality of identical convolver unit modules, only one of which (designated by numeral 101) is shown in detail. Each module accepts a stream of values from a scanned two dimensional function, and performs a partial filtering operation. The output of that module is then fed to the next module for further filtering.

Figure 10:
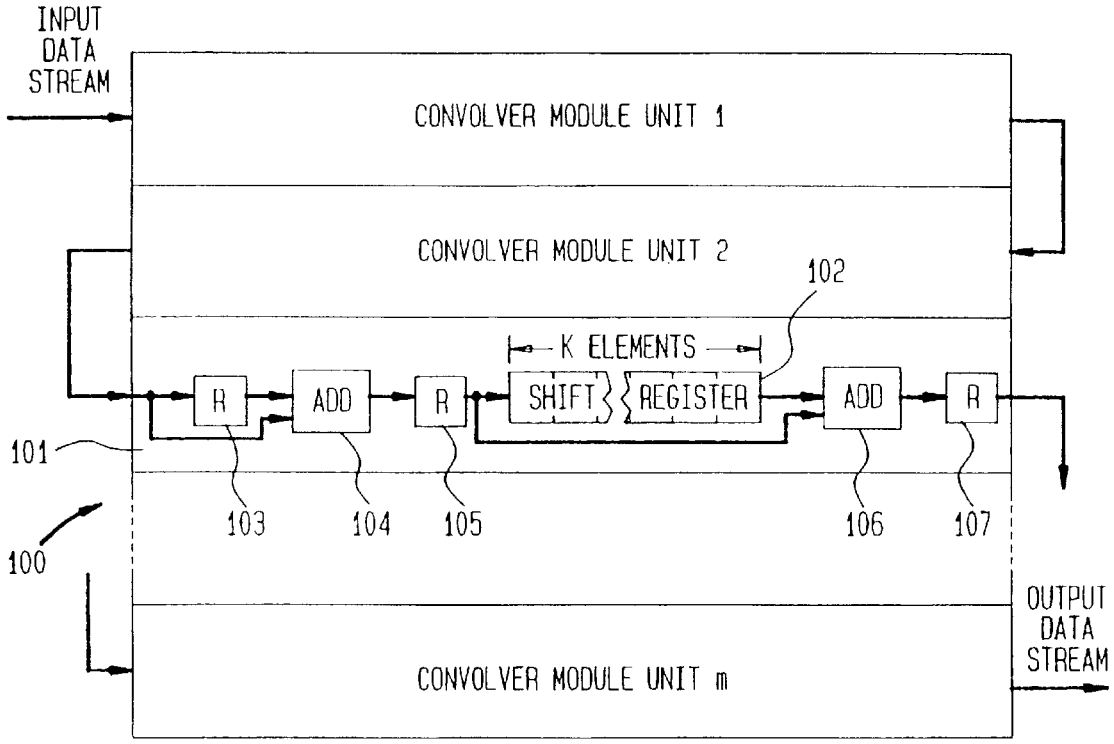
FIG. 10 is a schematic diagram of an one embodiment of apparatus by which a 2-dimensional convolution can be carried out on grey scale image data to form a convolved image.

Each module contains a shift register made of many (e.g., 2048) cells which are fed sequentially with a stream of grey level values from the camera. Under control of pulses from a clock (not shown), the contents of each cell is shifted (to the right as seen in FIG. 10) into the adjacent cell. The first step of the operation is to add two adjacent samples in the input signal to the module. This is achieved by delaying the input signal by one clock period using cell 103 and feeding its output together with the input stream to adder 104 whose output represent the boxcar function. The output of the adder may be delayed by cell 105, which is not essential for the correct operation of the module, but may be included in order to improve speed of operation. The output of cell 105 is down-shifted through shift register 102. Both the input to and the output from shift register 102 are fed into second adder 106 whose output is applied to last cell 107 which outputs the partial result into the next module. This stage completes convolution of the input stream with a two-dimensional boxcar of size 2×2 pixels. Each of cells 103, 105 and 107, and shift register 102 is pulsed by the same clock. Several modules, for example nine, are cascaded in order to perform the required filtering on the input stream applied to convolver unit 1 whose input signal is a scanned two dimensional function of row length of k samples. The output stream from the last cascaded module is a 2-dimensional convolution of the grey scale image.

Figure 11:
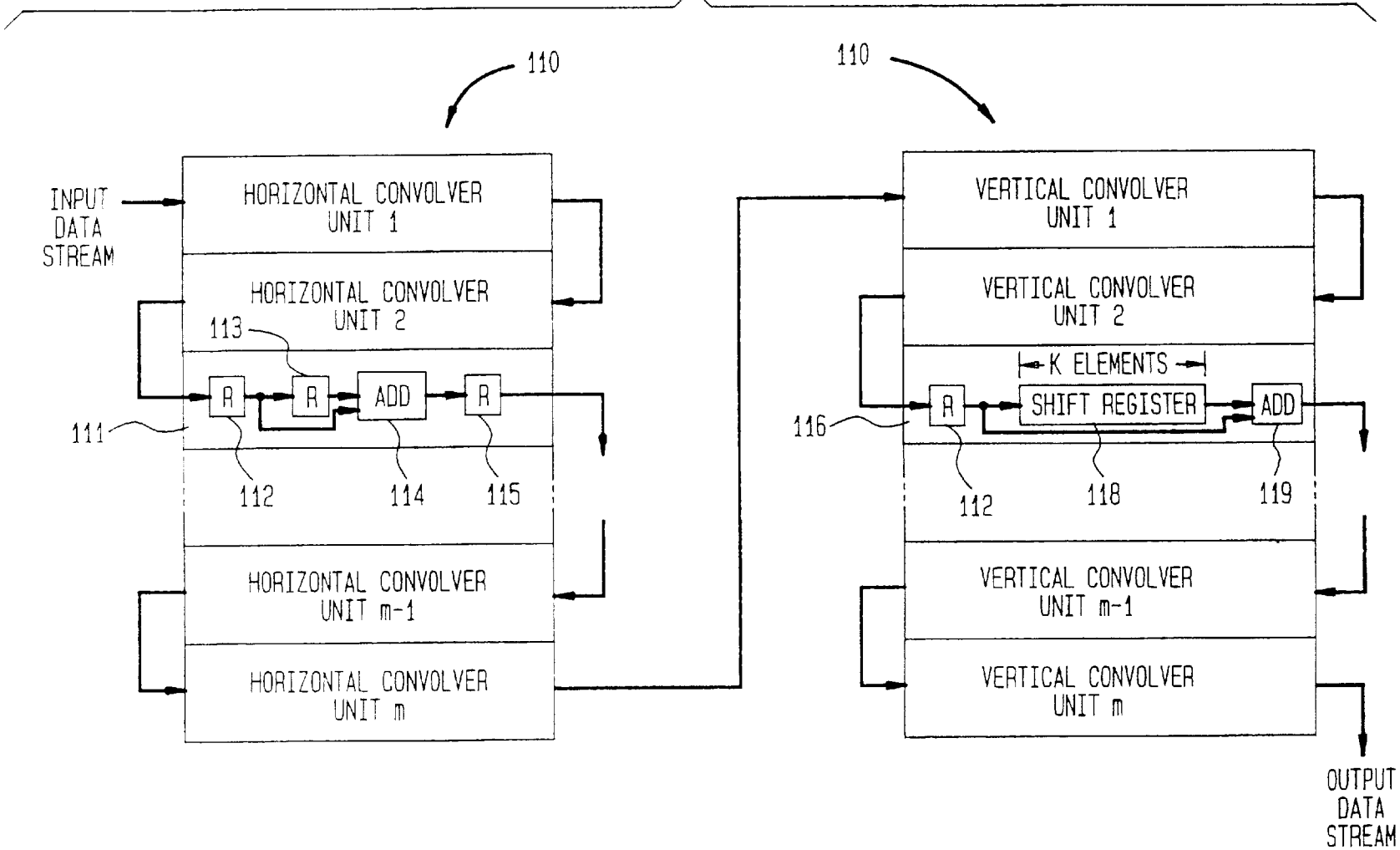
FIG. 11 is another embodiment of convolver.

Another embodiment of convolver, shown in FIG. 11 by reference numeral 110, carries out the same filtering functions as the apparatus shown in FIG. 10, except that the total delay through the circuit is different. Apparatus 110 comprises a plurality of horizontal and vertical convolver units. If the number of horizontal units is made equal to the number of vertical units, a symmetrical convolution is achieved. If the number of units in apparatus 110 is the same as in apparatus 100, the transfer function will be exactly the same except for a fixed delay in the output signal.

The horizontal block of apparatus 110 contains m units, each of which performs partial horizontal filtering or convolution. Two adjacent samples in cells 112 and 113 are summed by adder 114 which represent here the boxcar function. The output of the adder is fed into output cell 115. Cascading many horizontal units performs a 1-dimensional horizontal filtering. The output of the horizontal block is then fed into the vertical block.

The vertical block is made of identical units, each of which performs partial vertical filtering. Apparatus 116 shows one vertical unit. The signal is fed into the input cell 117. The output of that cell is down shifted along the shift register 118. Adder 119 adds the output of the shift register and the output of cell 117. The output of module 116 is fed into the input of the next module. The vertical modules perform a 1-dimensional convolution on the output of the horizontal module, completing in this manner a 2-dimensional convolution on the grey-scale image. All memory cells in the vertical or horizontal units as well as all shift registers are pulsed by a common clock (not shown) feeding the value of each cell into the adjacent cell.

The above described apparatus performs repeating convolutions with a boxcar function comprised of two adjacent pixels, the convolution can be achieved using a boxcar function comprising more than two adjacent pixels. This can be achieved, for example, by increasing the number of sampling cells and the number of shift registers, and consequently also increasing the number of inputs entering the adders per module.

As previously indicated, the convolution process requires a 2-dimensional convolution with the differences between Gaussian functions and this can be achieved in the manner indicated in FIGS. 10 and 11, the size of the boxcar function (i.e., its limits along the line of registers) is empirically selected to produce good correspondence between the bit map eventually produced and the actual board. While a line of data in the example described above is said to consist of 2048 pixels, it should be clear that this number is by way of example only and represents the number of photodetectors used in conventional scanning cameras. Furthermore, the 20-pixels window referred to above should also be considered as being an example because other windows, or even no window at all, can be used.

Finally, while the invention has been described in detail with reference to optical scanning of printed circuit boards, the inventive concept is applicable to other optical scanning problems, and more generally, to any 2-dimensional convolution problem. For example, the invention can be applied to inspecting hybrid boards as well as integrated circuits.

As described above, compensation circuit 45 supplies information to pre-processor 70 and memory 71 in order to effect conversion of the convolution sign map in interpolator memory 65 to a binary map of an object (e.g., a printed circuit board) in binary bit map 34 in order to accurately depict edges or contours (e.g., tracks in the case of printed circuit boards). The is process of conversion, called "binarization" of the pixels, may assign the value "ONE", for example, to pixels associated with metal traces, and the value "ZERO" to pixels associated with the substrate.

In the embodiment shown in FIG. 5, binarization is effected using the output of pre-processor 70 which produces an attribute of the surface of the object for each homologous pixel in the grey scale image of the object as supplied to the pre-processor by compensation circuit 45.

Such attribute establishes whether a pixel is part of a track or a part of the substrate. Specifically, the attribute is determined by comparing the grey level of a pixel with a global threshold (i.e., a threshold that is the same for all pixels regardless of their location in the map). If the threshold old is exceeded, the conclusion is that the pixel is part of a track; and if not, the pixel is part of the substrate. These conclusions are based on recognizing that the conductive tracks reflect more light and appear brighter than the substrate.

With many printed circuit boards, binarization using a fixed threshold applied globally will produce satisfactory results. However, as printed circuit boards become larger and more complex, and substrate material more exotic, it sometimes occurs that the grey scale value of a pixel from a metal element in one portion of a printed circuit board will have a value not significantly different from that of a pixel from a substrate element in another portion of the board. That is to say, if a single board has regions where the contrast between the tracks and the substrate differs, different thresholds would be required for the regions in order to obtain the proper attributes that would accurately reproduce all of the tracks on the board. The same situation occurs when the precision of focus of the optical system is different in different regions of a printed circuit board. Additionally, the problem is present when a single board contains regions of many fine, closely spaced tracks, and regions where the width of and spacing between the tracks are greater.

Reference is made to FIG. 12 to illustrate the problem of a single board 300 containing region 301 in which the contrast between track 302 and the substrate is lower than the contrast between track 303 and the substrate in region 304. In the graphs below board 300 in FIG. 14, sampled data points 305 represent the measured intensity of light reflected from track 302 and the substrate during scanning of track 302 in the direction indicated by arrow 306. Sampled data points 307 represent the measured intensity of light reflected from track 303 and the substrate during scanning. Typically, points 307 will be a family whose lowest values may exceed the peak value of the the family of points 305. Consequently, if threshold 308 were selected so as to be satisfactory for tracks in region 304, the threshold would be entirely unsatisfactory for tracks in region 301 because tracks in region 301 would not even appear in the final binary bit map.

Under the conditions described above, when fixed thresholding will not produce satisfactory results, a second embodiment of the present invention can be utilized. In this embodiment, a two-step binarization process is employed for classifying pixels as "white" (i.e., metal), or "black" (i.e., substrate).

In the first of the two-step process, those pixels capable of being classified unambiguously as either "white" or "black" are so classified, and the remaining pixels are tentatively classified as "other". The second step (called "painting") classifies each of the "other" pixels as either "white" or "black" by extending regions of pixels previously unambiguously classified as being "white" or black" according to present rules.

Unambiguous classification of pixels is achieved in two ways. One way involves identifying pixels near an edge or contour using grey-level data obtained by scanning. The other way involves identifying pixels that are surrounded by very high, or very low, grey-level values, and applying of-line calibration information in deciding the classification.

Pixels near an edge can be identified based on large scale transitions in grey scale values of adjacent pixels. Where such transitions occur in adjacent pixels, pixels with higher value grey scale values would be classified unambiguously as "white". Those with lower values would be classified unambiguously as "black".

For example, the grey scale map may contain a region where the grey scale level of the pixels changes abruptly from a low value, say 40–50 units, to a high value, say 80–90 units which indicates an edge. In this region, pixels with values in excess of 80 units would be classified as "white", and pixels with lower [vales] *values* would be classified as "black". In another region of the map, the grey scale level of the pixels may change abrubptly from a relatively higher value, say 70–80 units, to an even higher value, say 120 units of more indicating an edge. Insuch case, pixels with values of 80–120 units would be classified as "black", and pixels with values of 120 units or more would be classified as "white", etc.

As described in detail below, the first step in binarization according to the present invention involves comprising as ordered pair of numbers termed grey-level and grey-level differences for each pixel, and looking for sharp transitions. At locations where they occur, pixels are classified as "black" and "white" unambiguously based on the convolution values obtained as described previously. Negative convolution values permit unambiguous classification of the pixels as "black"; and positive convolution values permit unambiguous classification of the pixels as "white".

Pixels surrounded by very high, or very low, grey-level values can be identified directly from the grey-level values themselves. By carrying out an off-line calibrations that involves scanning a representative printed circuit board, the highest value of any substrate pixel can be determined. Any pixel, and its 3×3 neighbors, with an on-line grey level value in excess of this calibration value, can be classified unambiguously as "white". Similarly, any pixel, and its 3×3 neighbors, with an on-line grey level below the calibration value can be classified unambiguously as "black".

By following the first classification step of the present invention, all of the pixels are classified into unambiguous "white", unambiguous "black", and "other" categories. The second classification step of the present invention extends the regions of the previously classified "black" and "white" pixels using a number of preset rules. For example, if a pixel p is classified as "other", but its grey-level is lower than the grey level of a neighboring pixel q that is already classified as "black", then pixel p will be classified as "black", etc.

FIG. 13 illustrates the preferred manner of obtaining the ordered pair of numbers for each pixel in a grey scale map of an object. Reference numeral 320 represents a typical grey scale pixel "A" for which an ordered pair of numbers is to be obtained. Surrounding pixel 320 are its eight adjacent neighboring pixels designated pixels "B" to "T". The grey scale level of each of these nine pixels is known by reason of the scanning process described above, and these grey scale levels are used to compute the ordered pair of numbers. This is achieved by computing the absolute value of the difference in grey levels in the two principle (i.e., orthogonal) directions labeled directions 1 and 2 in the drawing, and in the two diagonal directions labeled 3 and 4. In direction 1, the quantity $Ig_1-g_EI$, which is the absolute value of the difference in grey level values for pixels "T" and "E" in FIG. 13, is computed, etc. In computing the absolute values in the diagonal directions, the absolute values of the differences in grey-level values are normalized by dividing the difference by 1,414 to take into account the different distances between pixels in the diagonal directions as compared with the principle directions.

The largest of the four absolute value difference identifies the direction of greater change in grey level about the selected pixel "A". In this direction, the average grey-level of the appropriate two pixels is computed as $(g_{avg})_A$, and the difference between the grey levels of these pixels is computed as $(d_{max})_A$. By following this procedure, an ordered pair of numbers $g_{avg}$, $d_{max}$ can be computed for each pixel in the grey level map. The ordered pair of numbers so obtained for each pixel is plotted against a threshold function (T.F.) obtained by a calibration process that is described on detail below. By its nature, the T.F. is dependent on the grey level of a pixel and its location. As shown in FIG. 14, the threshold function has the following general form:

$$\text{for } 0<(g_{avg})<G_{min},\ \text{T.F.}=D_{min}$$

$$(g_{avg})>G_{max},\ \text{T.F.}=D_{max}$$

$$G_{min}<(g_{avg})<G_{max},\ \text{T.F.=step variation}$$

where $D_{min}$, $D_{max}$, and the step variation are determined according to an off-line calibration process described below.

Point 321 represents the point on the grey-level/grey-level-difference plane associated with pixel "A". Because this point lies above the threshold function 322, pixel "A" represents part of a track, and would be assigned the value ONE in what is termed a gradient-enable binary map. On the other hand, point 323, based on some other pixel, lies below curve 322; and the value ZERO would be assigned to the pixel associated with point 323 indicating this pixel represents the substrate.

The threshold function for a given printed circuit board is not arbitrary, but is closely related to the particular board and the configuration of the tracks thereon. That is to say, the threshold function is determined from an off-line calibration process based on analyzing one, but preferably, a number of identical actual boards to be inspected. The procedure to obtain the threshold function for a particular board is listed in FIG. 15 to which reference is now made. Specifically, the procedure may be carried out on a small sample of the entire population of boards and a threshold function derived for each board in the sample in order to obtain a composite threshold function that is the average of the threshold functions for the sampled boards.

Figure 15:
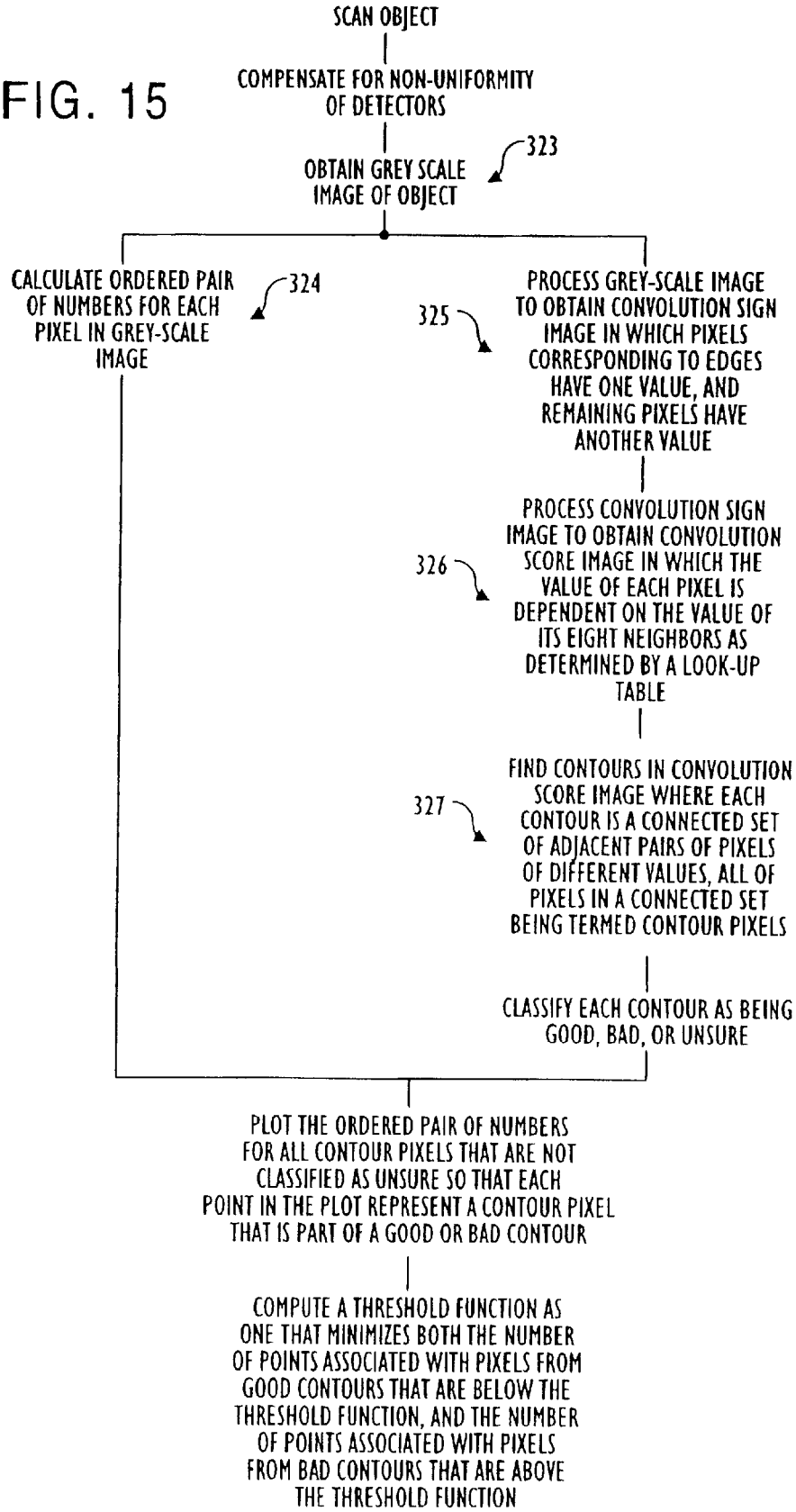
FIG. 15 is flow chart that shows the off-line calibration procedure to obtain a threshold function of the present invention.

As indicated in FIG. 15, the initial steps for obtaining the threshold function are the same as the steps in inspecting a printed circuit board in the board is scanned. That is to say, the grey-scale levels are compensated for non-uniformity, and a grey scale image of the board is obtained and stored for processing in step 323. In step 324, calculating an ordered pair of numbers for each pixel may occur immediately after three grey-scale image of the board is obtained, or may be deferred until needed. Regardless, a convolution sign map is computed from the grey scale map by carrying out the two dimensional convolution process described above as indicated in step 325. So far, except for calculating the ordered pair of numbers, the processing carried out is identical to what has been described in connection with the embodiment shown in FIG. 5.

Figure 16:
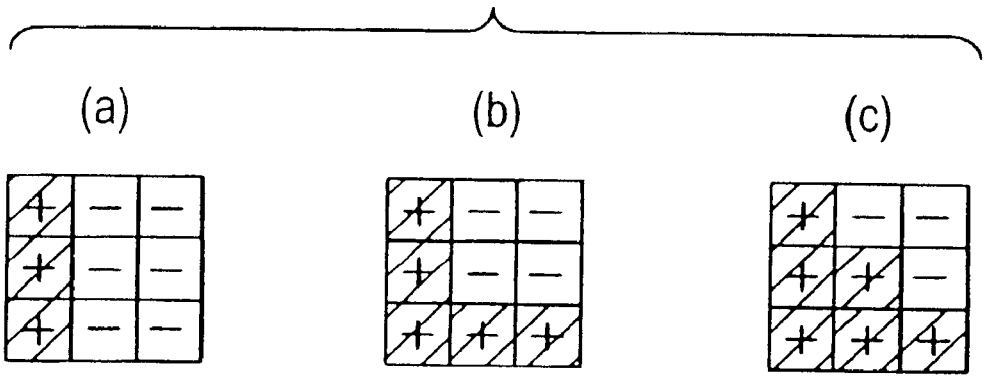
FIGS. 16 and 17 are various 3×3 matrices of pixels showing some of the combinations of transition and non-transition pixels which, respectively, represent probable edges and not-probable edges which are used during the calibration operation.
Figure 17:
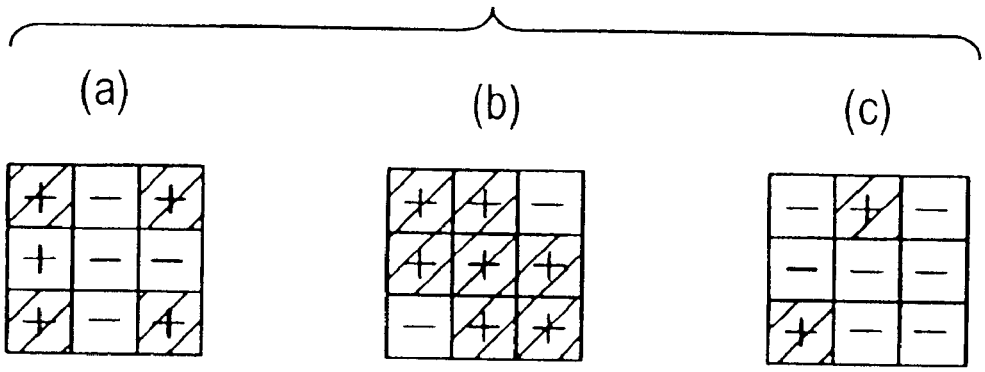

For the purposes of calibration, the convolution sign image is processed in step 326 to obtain a convolution score image or map in which the value of each pixel in the convolution sign map is evaluated by taking into account the convolution signs of its eight neighbors to the end that the pixel in the convolution score map reflects the a priori probability that the pixel is part of a valid edge neighborhood. This is implemented in a look-up table whose address is the nine bits of the convolution sign on the 3×3 matrix of pixels. The contents of the look-up table is computed in a different off-line process that is done beforehand by human judgment and evaluation of all possible $2^9$ combinations. The judgment may be biased on the following criteria: if the 3×3 neighborhood can be partitioned into two connected regions, one with positive convolution signs and the other with negative convolution signs, then the configuration represents a valid edge neighborhood. FIGS. 16(a)–(c) represent some configurations for valid edges. Representative configurations that are not valid edge neighborhoods are illustrated in FIGS. 17(a)–(c).

After step 326 is carried out, contours in the convolution score map are evaluated as indicated in step 327. A contour in this context, is composed of pairs of connected pairs of contour pixels. A pair of contour pixels is a pair of adjacent pixels of opposite sign. Pairs of contour pixels are connected if their pixels are adjacent *at* four sides.

Figure 18:
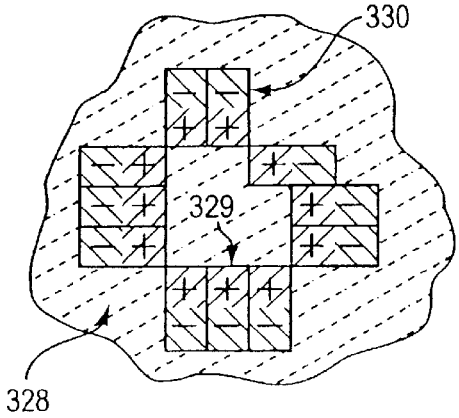
FIGS. 18 and 19 show examples of good and bad contours, respectively, in the binary map produced by the convolution process, and used during the calibration operation.
Figure 19:
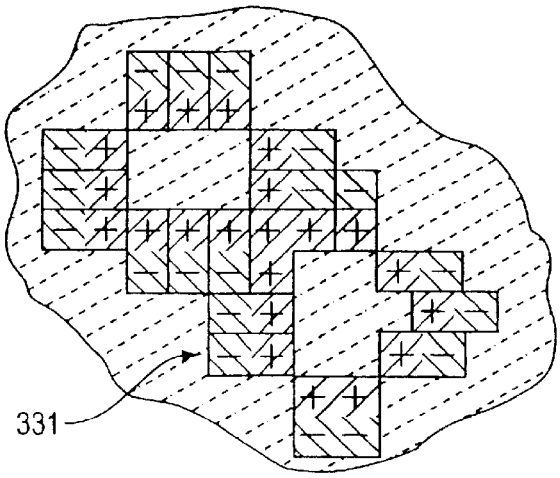

Each of FIGS. 18 and 19 shows a contour. In FIG. 18, contour 328 has inner contour 329 and outer contour 330. Inner contour 329 is made up of the collection of transition pixels of the connected pairs of pixels making up the contour; and outer contour 330 is made of the collection of the other pixels of the connected pairs.

The calibration process involve grading the contours after they are located and the connected pairs of pixels are identified. The grading is a score assigned to the collection of pixels that make up a contour according to the probability that the contour is a contour in the object. The score is based on a ratio of contour length (in pixels) to "bad" indications along the contour. The "bad" indications are described below, suffice it to say at this point that, after the contours have been scored, they are divided into three groups according to their score. "Good" contours are contours with high scores; "bad" contours are contours with low scores; and "unsure" contours are contours with intermediate scores. Contour 328 in FIG. 18 is an example of a "good" contour because it does not cross itself like contour 331 shown in FIG. 19, which is an example of a "bad" contour.

Figure 20:
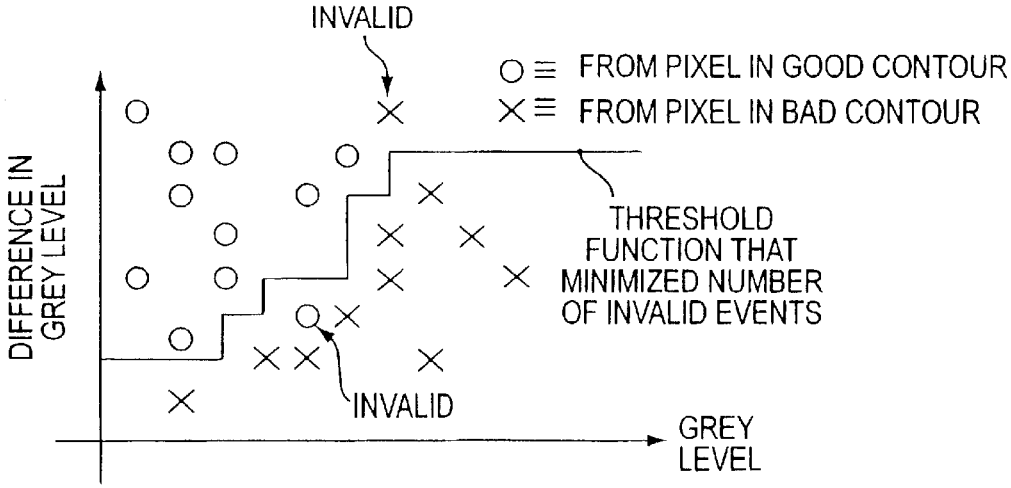
FIG. 20 shows how a threshold function is derived from the ordered pairs of numbers associated with pixels from good and bad contours during the calibration operation.

All the pixels have ordered pairs of numbers associated therewith according to step 324. Only those pixels associated with "good" and "bad" contours are mapped into points in the grey-level-difference/grey-level plane as shown in FIG. 20. However, the mapping is done so that "good" contour pixels are separately identified from "bad" contour pixels. This is shown in FIG. 20 where the "0's" are indicative of pixels associated with "good" contours, and the "X's" are indicative of pixels associated with "bad" contours.

A threshold function is then plotted having the form:

$$\text{for } 0<(g_{avg})<G_{min},\ \text{T.F.}=D_{min}$$

$$(g_{avg})>G_{max},\ \text{T.F.}=D_{max}$$

$$G_{min<(gavg)}<G_{max},\ \text{T.F.=step variation}$$

More specifically, the threshold function is one that minimizes both the number of points associated with pixels from good contours that are below the threshold function, and the number of points associated with pixels from bad contours that are above the threshold function. Points associated with pixels from good contours which fall below the threshold function, and points associated with pixels from bad contours which fall above the threshold function, are termed pixels violations; and the threshold function that is selected is one that minimizes the number of pixel violations. In this manner, the values of $G_{min}$, $G_{max}$, $D_{min}$, $D_{max}$, and the step variation between $G_{min}$, $G_{max}$ are determined.

As indicated above, the procedure for scoring contours during the calibration process is based on determining the ratio of contour length in pixels to bad indications along the contour. A bad indication may be one of the following: (a) a junction, which is a place where the contour crosses itself as shown in FIG. 19; (b) an extremely low value of average grey level as computed according to the procedure associated with FIG. 13; (c) a bad configuration score as computed according to FIGS. 16 and 17; or (d) large variance of grey levels for either the contour inner pixels or the contour outer pixels. The scoring procedure is somewhat subjective but may be based on an iterative process in which a procedure with certain assumptions is carried out and a comparison is made with the actual period circuit board to evaluate whether the assumptions are valid.

Apparatus for taking into account objects with location dependent threshold functions is shown in FIG. 21 to which reference is now made. Data from the object being scanned is applied to CCD 44, and corrected for non-uniformity by compensation circuit 45, as previously described. Corrected grey scale image data produced by circuit 45 is applied in parallel to convolver 47 and to pre-processor 70a.

The convolver circuit, as described above, processes the grey level image and produces, for each pixel, a convolution value which is a signed number. In the preferred embodiment, the signed number is a 9-bit signed integer lying between −256 and +258. The map may be an implementation of difference-of-Gaussians (DOG) computation, which roughly speaking, shows the amount of total curvature of the grey-level image when considered as a topological surface.

Pre-processor 70a operates on the same input as the convolver, and produces, for each input pixel, two maps: a gradient-enable map, and an adjacency map, both of which are described in detail below. The two computation are carried out in the same circuit for reasons of convenience, because they share common tasks, mainly the task of determining the four gradients around a given pixel.

Figure 22:
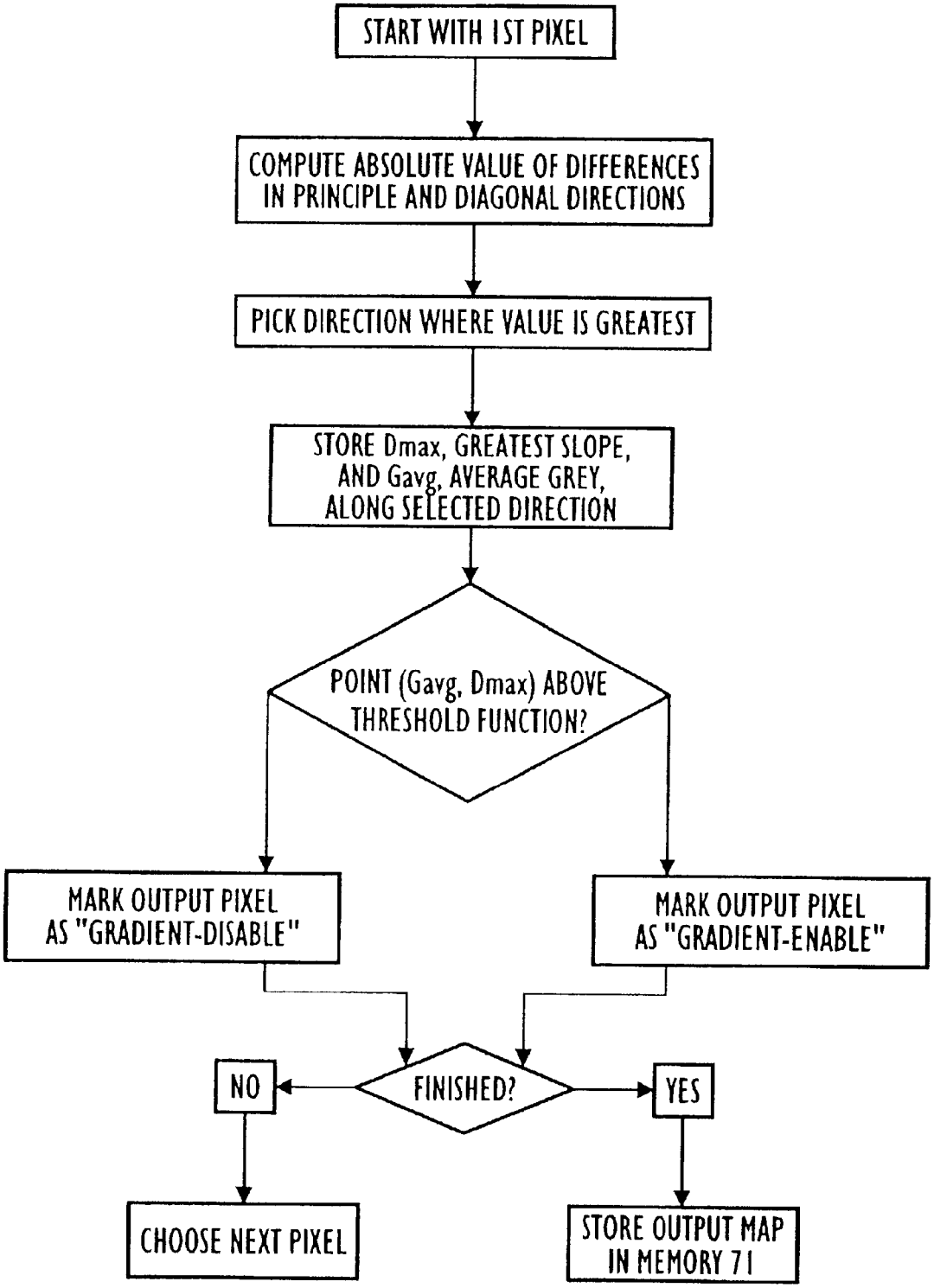
FIG. 22 is a flow chart showing an initial step in binarization according to the present invention.

Computation of the gradient-enable map is described with reference to FIG. 22. The first task is to compute the absolute values of differences of grey-levels along the two [principal] *principle* and the two diagonal directions, and from this information, the coordinates $g_{avg}$ and $d_{max}$ for each pixel can be computed as described in connection with FIG. 14. Pixels that are mapped into a point above the threshold function graph are designated as gradient-enable pixels; and all others as gradient-disable pixels. The gradient-enable map so obtained is stored in memory 71.

Threshold register 201 in FIG. 21 contains thresholds that were predetermined by the off-line calibration procedure and that will be used in the following stages of the computations, as will be detailed below.

Figure 23A:
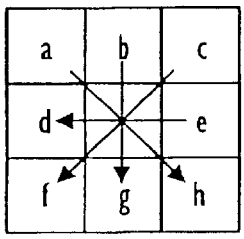
FIG. 23A represents a 3×3 array of pixels in the grey level map.
Figure 23B:
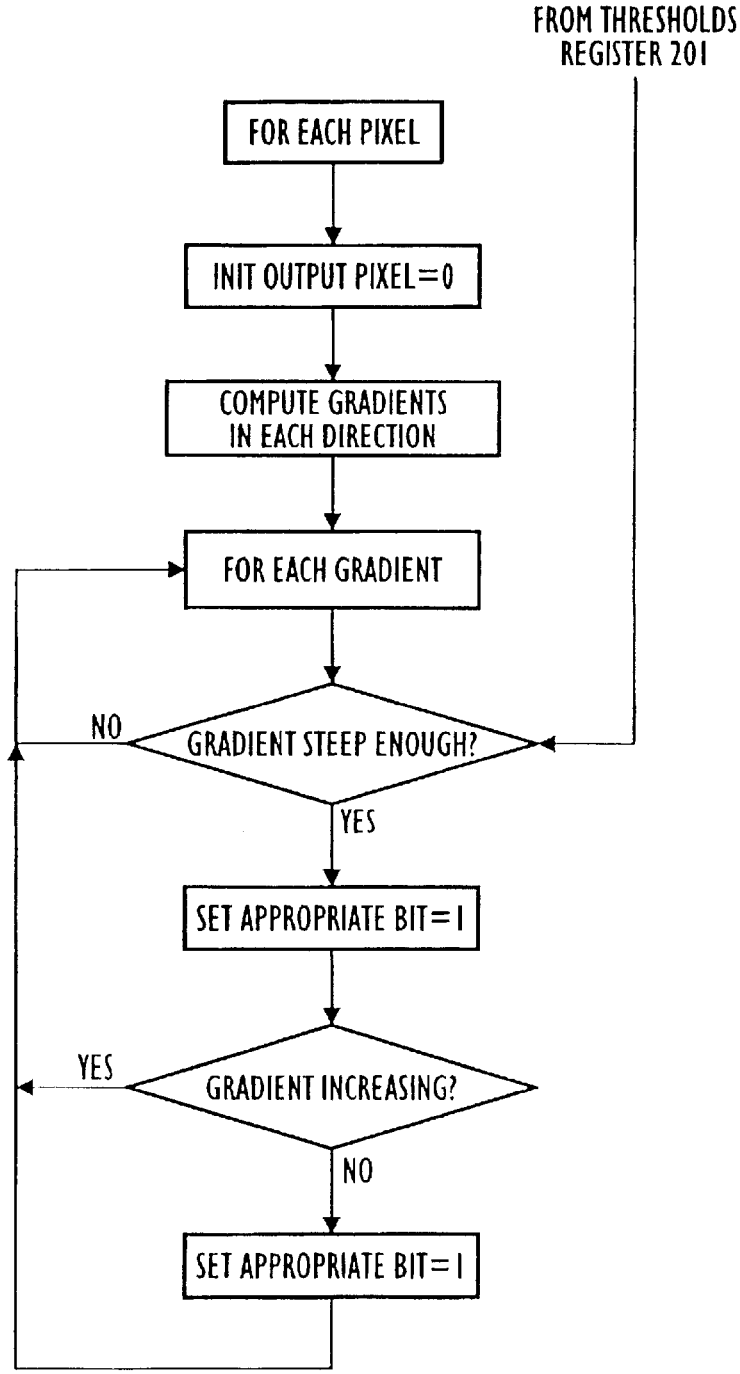
FIG. 23B is a flow chart showing the steps in obtaining an adjacency map.

Computation of the adjacency map is described with reference to FIGS. 23A and 23B. In this map, for every pixel, the neighbors which may issue a "BLACK" recommendation are marked, and similarly the neighbors which may issue a "WHITE" recommendation. This map requires eight bits of data: four bits to mark those directions which have a steep enough gradient, and four addition bits to mark the sense of each gradient, increasing or decreasing. Note that then are only two possible arrangements along any given directions: either the gradient is too shallow and no recommendation can be issued, or else one of the neighbors in this direction is a potential "WHITE" recommendant and the opposite neighbor a potential "BLACK". The adjacency map so obtained is stored in memory 71.

The input to convolution processor 200 consists of several image maps as detailed below; and additional maps are computed during its operation. The final output of processor 200 is a revised convolution map that agrees with the original convolution map produced by circuit 47 as to contour pixels, to allow proper interpolation and precise localization of the contours, and may have revised values in other areas of the image. The nature of these computations and the resulting maps will now be explained with reference to FIG. 24, which explains the preferred configuration of convolution processor 200.

The inputs to circuit 200 are: a convolution map from 2D-convolver 47, gradient-enable and adjacency maps from memory 71, a corrected grey-level map from compensation circuit 45, and thresholds from threshold register 201. In subsequent stages of the computation, more maps are computed. The nature of each map and its derivation procedure are explained below.

The convolution-sign map 251 is produced by simply copying the sign bit from the convolution map.

Contour map 253 shown in FIG. 24 is obtained following the procedure described below. A pixel is classified as a contour pixel if it satisfies the following requirements: (1) it is enabled in the gradient-enable map; (2) it has a neighbor which is gradient-enabled; and (3) the pixel and its neighbor have opposite signs in the convolution sign map. The map that results has the pixels classified into three categories; "WHITE" contour pixels (contour pixel, negative convolution sign). "BLACK" contour pixel (contour pixel, positive convolution sign) and "OTHER", or non-contour pixels.

The optional filtered-contour map 254 (FIG. 24) is obtained by passing the contour map through a filtering mechanism, if necessary. This is used to remove small specks from the contour map. This may be useful, for example, when the original board is very dirty. The filter mechanism operates to transform some combination of "WHITE" and "BLACK" pixels into class "OTHER", in accordance with the results of several steps of shrinking and expanding the map. Such operations are well known and are described, for example, in "Digital Image Processor" by A. Rosenfeld and A. Kak, Academic Press, 1982. Vol. 2. pp. 215–217 which is hereby incorporated by reference.

The high-sure/low-sure map (FIG. 24) is obtained by comparing a pixel together with its eight neighbors against two thresholds. This is detailed in FIG. 25. If the pixel, together with all of its eight neighbors, have lower grey level values than the threshold $G_{min}$, the pixel will be classified as "BLACK". If the pixel, together with all its eight neighbors have higher grey level values than the threshold $G_{max}$, the pixel will be classified as "WHITE". Otherwise, the pixel is classified as "OTHER".

Mask-image map 255 (FIG. 24) is obtained by combining the high-sure/low-sure map with the filtered contour map. That is, a pixel is classified as "WHITE" if it is "WHITE" in the high-sure/low-sure map, or if it is "OTHER" in the high-sure/low-sure map and "WHITE" in the filtered contour map. A pixel is classified as "BLACK" if it is "BLACK" in the high-sure/low-sure map, or if it is "OTHER" in the high-sure/low sure map and "BLACK" in the filtered contour map. Finally, a pixel is classified as "OTHER" only if it is so classified in both maps.

The next stage, as shown in FIG. 24, is painting, the purpose of which is to ensure that all pixels are eventually classified as either "BLACK" or "WHITE", with no pixels of class "OTHER" remaining. Once this is achieved, the convolution map is ready to be revised, wherever the color of a pixel disagrees with the original convolution sign. The resulting revised map is "paint map" 257.

Figure 26:
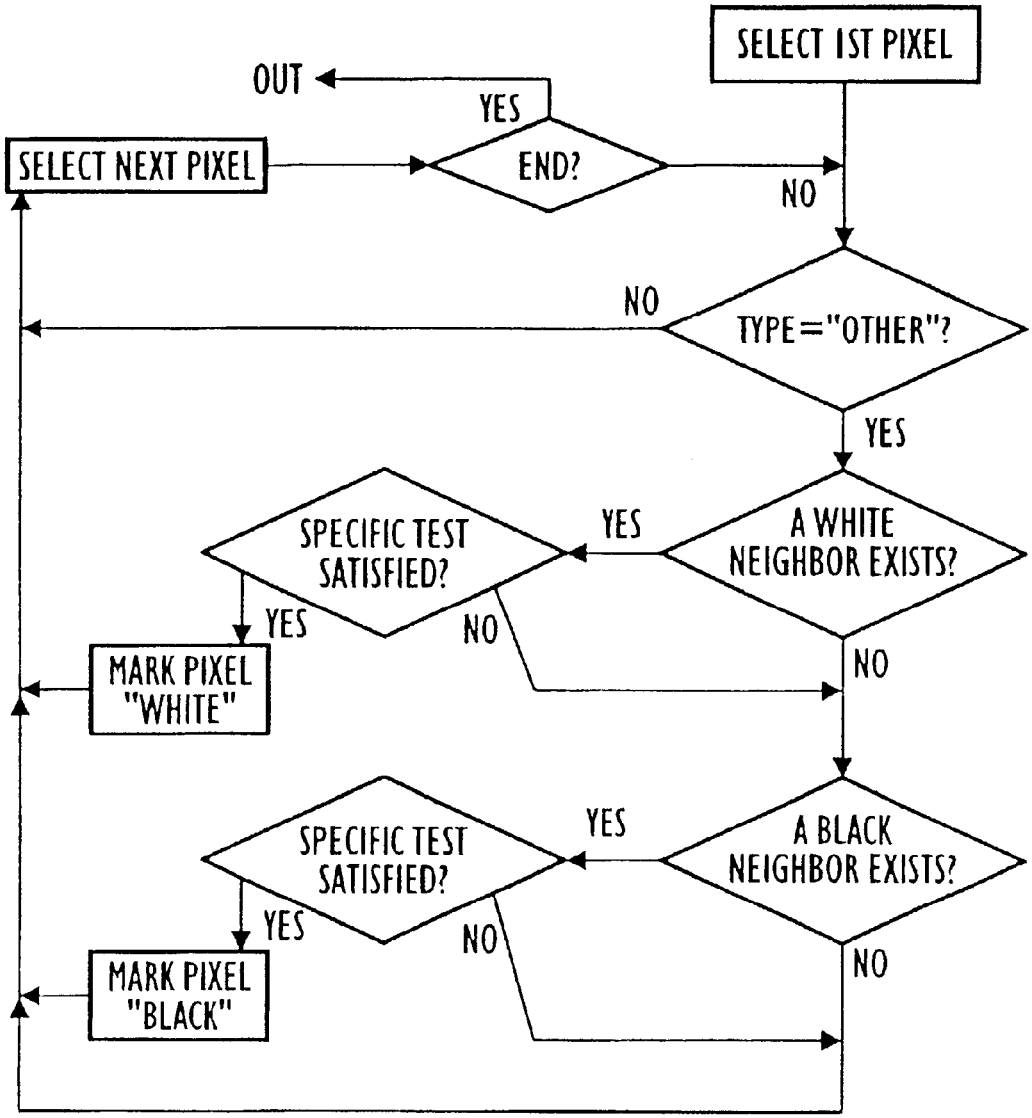
FIG. 26 is a flow chart showing the steps carried out in "painting" certain pixel according to FIG. 24.

The operation of painting stages 256 is now described. There are three types of painting procedures: adjacency paint ("A"), majority paint ("M"), and tow paint ("T"). The precise sequence of steps is application dependent and is empirically determined. In the preferred embodiment, about 10 A steps followed by 2 M steps terminated by one T step are used. Common to all steps is the following operation: a pixel of class "OTHER" will be changed into one of class "BLACK" or "WHITE" provided that one of its eight neighbors is of this class and that another specific condition is met. This is described in FIG. 26. The specific test conditions for each of the three paint types is now discussed.

For the adjacency, or "A" type pain step, the condition is as follows: if a neighbor is "WHITE" and the grey level gradient in the direction of this neighbor is smaller then some (empirically) predefined constant (negative) number, a "WHITE" recommendation is issued. Similarly, if a neighbor is "BLACK" and the grey level gradient in the direction of this neighbor is higher than one (empirically) predefined constant (positive) number, a "BLACK" recommendation is issued. The reason here is that if, for example, a neighbor is "white", and the current pixel is lighter than this neighbor (in the grey-level map), then it must be "white" also. Finally, if the recommendations of all four directions are unanimous, then they are adopted and the class of the pixel is changed accordingly. If there is no recommendation, or else, if there are conflicting recommendations, the test is considered failed and the pixel remains of class "OTHER".

For the majority, or "M" type paint step, the condition for "WHITE" is this: the number of white neighbors should be larger than that of black neighbors. The condition for "BLACK" in the reverse condition.

For the tow, or "T" paint step, the resulting pixel will always be classified as either "BLACK" or "WHITE". The determination of the class is by the color of the top three neighboring pixels, which have already been processed in this step. Thus, out of the three there must be a majority of at least two "WHITE" or two "BLACK" pixels. The class of the majority determines the class of the current pixel.

Once painting is completed, revision of the convolution map is the next (and last) step to be carried out prior to interpolation. The procedure is detailed in FIG. 27. If the paint map color agrees with the convulsion sign, then the original value of the convolution map is output. Otherwise, the output is +1 for a ["WRITE"] *"WHITE"* pixel in the paint map, and −1 for a "BLACK" pixel.

The advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. A process for producing a binary map of an object having a surface each elemental area of which has one or the other of two properties, said process comprising:

a) scanning said surface to obtain data representative of a grey scale image of said surface with a given *spatial* resolution;

b) processing said data representative of said grey scale image to produce data representative of a map of said object having signed values that identify adjacent elemental areas of said surface having different properties, said map having the same *spatial* resolution as said grey scale image; and c) converting said data representative of a map of said object having signed values to a binary map of said surface with a *spatial* resolution higher than the *spatial* resolution of said grey scale image.

2. A process according to claim 1 wherein data representative of the properties of said surface are obtained during the scanning of said surface, and are utilized during process of converting said data representative of a map said object to said binary map.

3. A process according to claim 2 wherein processing:

data includes convolving with a filter function that approximates the second derivative of a Gaussian function.

4. A process according to claim 2 wherein said data representative of the properties of said surface are obtained by comparing the data representative of a grey scale image of said surface with a calibration function.

5. A process according to claim 4 wherein the calibration function is independent of the location of elemental areas said surface.

6. A process according to claim 4 wherein the calibration function is a fixed threshold.

7. A process according to claim 4 wherein the calibration function is a variable threshold.

8. A process according to claim 4 wherein the calibration function is dependent on the grey scale levels of the grey scale image.

9. A process according to claim 8 wherein the data representative of the properties of said surface involve a comparison of the grey level of a pixel in the grey scale image with the grey levels of adjacent neighboring pixels said grey scale image.

10. A process according to claim 8 wherein a plurality adjacent neighboring pixels to each pixel are involved said comparison.

11. A process according to claim 10 wherein said comparison is achieved by determining the maximum difference between the grey scale level of the particular pixel and the grey scale levels of neighboring pixels, and averaging the grey scale levels of the particular pixel and the neighboring pixel that produces the maximum difference.

12. A process according to claim 4 wherein said calibration function is obtained by an off-line calibration process.

13. A process according to claim [i] 1 wherein the process of converting data to said binary map includes assigning states to those binary map pixels whose states are capable of being classified unambiguously, including those binary map pixels that are homologous to elemental areas of said surface identified in step (b) of claim 1, and assigning states to the remainder of the binary map pixels according to pre-set rules.

14. A process according to claim 13 including computing an ordered pair of numbers for each pixel in the grey scale image, and assigning a tentative state to each pixel in accordance with a threshold function obtained by an off-line calibration process.

15. A process for producing a binary map of an object having a surface each elemental area of which has one or the other of two properties, said processing comprising:

a) scanning said surface to obtain data representative of a grey scale image of said surface with a given resolution;

b) convolving said data representative of said grey scale image to produce a convolution map of said object having signed values;

c) producing from said data representative of said grey scale image, a binary gradient-enable map for identifying pairs of contour pixels which are pixels homologous to elemental areas of said surface having different properties, and a binary adjacency map for identifying pixels whose neighboring pixels have a grey level gradient exceeding a threshold; and using said gradient-enable map and said adjacency map to create a binary of said surface with said given resolution; and e) interpolating said binary map to form a binary map of said object with a resolution higher than the resolution of said grey scale image.

16. A process for off-line production of a threshold function comprising:

a) scanning an object having a surface each elemental area of which has one or the other of two properties to obtain data representative of a grey scale image of said surface;

b) processing said grey scale image to obtain data representative of a binary image in which pixels homologous to elemental areas of said surface at which transitions of said properties occur have a given state and the remaining pixels have the opposite state;

c) convolving said data representative of said grey scale image to produce a convolution score image in which the value of each pixel is dependent on the value of its eight neighbors as determined by a look-up table;

d) identify contours in said convolution score image;

e) classify each contour as being good, bad, or unsure;

f) calculate for each pixel in the grey scale image, an ordered pair of numbers;

g) plot the ordered pair of numbers for each contour pixel that in not classified as being unsure;

h) compute a threshold function from the plotted ordered pairs of numbers as a function that minimizes both the number of points associated with pixels from good contours that are below the threshold function, and the number of points associated with pixels from bad contours that are above the threshold function.

*17. A process for analyzing a surface, comprising:*

*developing a first collection of data elements, each data element in said first collection of data elements representing optical characteristics of one of a plurality of areas of a surface to be analyzed;*

*modifying at least some of said data elements in said first collection of data elements in accordance with optical characteristics of areas adjacent, in at least two non-parallel directions, to the area represented by the data element being modified; and*

*processing at least some of said modified data elements to provide a second collection of data elements each data element in said second collection representing a spatial location within one of said plurality of areas of said surface.*

*18. The invention of claim 17, wherein developing said first collection of data elements further comprises:*

*creating a grey scale bitmap of said surface.*

*19. The invention of claim 17, wherein modifying some of said data elements in said first collection further comprises:*

*applying a filter function to said some of said data elements in said first collection.*

*20. The invention of claim 17, wherein processing at least some of said modified data elements further comprises:*

*interpolating between said modified data elements to locate said boundaries.*

*21. The invention of claim 17, wherein processing said modified data elements further comprises:*

*developing a plurality of binary data elements for each of some of said data elements.*

*22. The invention of claim 17, wherein processing said modified data elements further comprises:*

*developing a bitmap of said surface, each element of said bitmap representing one of said spatial locations.*

*23. A method for automated optical inspection of an electrical circuit, comprising:*

*forming a digital grey scale image of an electrical circuit, said grey scale image having a given grey scale image spatial resolution;*

*determining locations of edges within pixels in said digital grey scale image;*

*producing a digital map of said electrical circuit with reference to said edges, said digital map having a digital map spatial resolution which is greater than said given grey scale spatial resolution; and*

*analyzing the digital map to detect defects in said electrical circuit.*

*24. A method for inspecting an electrical circuit according to claim 23 wherein forming a digital grey scale image comprises a acquiring measured grey scale data for a plurality of elemental areas on said electrical circuit and applying said measured grey scale data to grey scale image pixels.*

*25. A method for inspecting an electrical circuit according to claim 24 wherein said determining locations of edges comprises determining a sub-grey scale image pixel location of at least part of an edge.*

*26. A method for inspecting an electrical circuit according to claim 25 wherein said producing a digital map includes providing digital map elements that are smaller than said grey scale image pixels.*

*27. A method for inspecting an electrical circuit according to claim 26 wherein said digital map elements are binary image pixels.*

*28. A method for inspecting a patterned surface, comprising:*

*forming a digital grey scale image of the patterned surface, said digital grey scale image having a given grey scale image spatial resolution;*

*determining locations of edges within pixels in said digital grey scale image;*

*producing a digital map of said electrical circuit with reference to said edges, said digital map having a digital map spatial resolution which is greater than said given grey scale image spatial resolution; and*

*analyzing the digital map to detect defects in the patterned surface.*

*29. A method for inspecting a patterned surface according to claim 28 wherein forming a digital grey scale image comprises acquiring measured grey data for a plurality of elemental areas on said electrical circuit and applying said measured grey data to grey scale image pixels.*

*30. A method for inspecting a patterned surface according to claim 29 wherein said determining locations of edges comprises determining a sub-grey scale image pixel location of at least part of an edge.*

*31. A method for inspecting a patterned surface according to claim 30 wherein said producing a digital map includes providing digital map elements that are smaller than said grey scale image pixels.*

*32. A method for inspecting a patterned surface according to claim 31 wherein said digital map elements are binary image pixels.*

*33. A process for analyzing a patterned surface, comprising:*

*developing a first collection of data elements, each data element therein representing one of a plurality of areas of said surface; and*

*processing at least some data elements in said first collection in accordance with an optical characteristic of areas adjacent, in at least two non-parallel directions, to the area represented by a data element being processed to provide a second collection of data elements, each data element in said second collection representing a spatial location within one of said plurality of areas of said surface.*

*34. A process for analyzing a patterned surface according to claim 33 wherein said patterned surface is a surface of an electrical circuit substrate.*

*35. A process for manufacturing an electrical circuit substrate, comprising:*

*depositing at least one conductive member on a surface of an electrical circuit substrate;*

*developing a first collection of data elements, each data element therein representing one of a plurality of areas of said surface;*

*modifying at least some of said data elements in said first collection of data elements in accordance with optical characteristics of areas adjacent, in at least two non-parallel directions, to the area represented by the data element being modified;*

*processing at least some of said modified data elements to provide a second collection of data elements each data element in said second collection representing a spatial location within one of said plurality of areas of said surface;*

*analyzing said second collection of data elements to detect defects in said electrical circuit substrate.*

*36. A process for manufacturing an electrical circuit substrate, comprising:*

*depositing at least one conductive member on a surface of an electrical circuit substrate;*

*forming a digital grey scale image of said electrical circuit substrate, said digital grey scale image having a given grey scale image spatial resolution;*

*determining locations of edges within pixels in said digital grey scale image;*

*producing a digital map of said electrical circuit substrate with reference to said edges, said digital map having a digital map spatial resolution which is greater than said given grey scale spatial resolution; and*

*analyzing said digital map to detect defects in said electrical circuit substrate.*

*37. A process for manufacturing an electrical circuit substrate, comprising:*

*depositing at least one conductive member on a surface of an electrical circuit substrate;*

*developing a first collection of data elements, each data element wherein representing one of a plurality of areas of said surface;*

*processing at least some data elements in said first collection in accordance with an optical characteristic of areas adjacent, in at least two non-parallel directions, to the area represented by a data element being processed to provide a second collection of data elements, each data element in said second collection representing a spatial location within one of said plurality of areas of said surface; and*

*analyzing said second collection of data elements to detect defects in said electrical circuit substrate.*

* * * * *

UNITED STATES PATENT AND TRADEMARK OFFICE

CERTIFICATE OF CORRECTION

PATENT NO. : RE 38,559 E
DATED : July 27, 2004
INVENTOR(S) : Caspi et al.

It is certified that error appears in the above-identified patent and that said Letters Patent is hereby corrected as shown below:

Title page,
Item [63], Related U.S. Application Data, please replace "07/061,344" with -- 08/061,344 --.
After Item [76], please insert Item:

-- [73] Assignee: Orbotech Ltd., Yavne, Israel (IL) --.

Column 20,
Line 6, please replace "processing:" with -- processing said --.
Line 29, please replace "involved said" with -- involved in said --.

Column 21,
Line 1, please replace "using said" with -- d) using said --.

Column 22,
Line 18, please replace "comprises a acquiring" with -- comprises acquiring --.
Line 49, please replace "grey data" with -- gray scale data --.

Signed and Sealed this

Twenty-eighth Day of December, 2004

JON W. DUDAS
*Director of the United States Patent and Trademark Office*